US012495861B2

(12) United States Patent
Gaba et al.

(10) Patent No.: US 12,495,861 B2
(45) Date of Patent: Dec. 16, 2025

(54) SOLE STRUCTURE FOR AN ARTICLE OF FOOTWEAR HAVING ENHANCED ROLL ACCELERATION

(71) Applicant: Under Armour, Inc., Baltimore, MD (US)

(72) Inventors: Monibert Narito Gaba, Portland, OR (US); Tom Luedecke, Portland, OR (US); James Webster, Portland, OR (US)

(73) Assignee: Under Armour, Inc., Baltimore, MD (US)

( * ) Notice: Subject to any disclaimer, the term of this patent is extended or adjusted under 35 U.S.C. 154(b) by 24 days.

(21) Appl. No.: 18/491,760

(22) Filed: Oct. 21, 2023

(65) Prior Publication Data

US 2024/0130464 A1    Apr. 25, 2024
US 2024/0225177 A9    Jul. 11, 2024

Related U.S. Application Data

(60) Provisional application No. 63/418,059, filed on Oct. 21, 2022.

(51) Int. Cl.

| | | |
|---|---|---|
| *A43B 13/02* | (2022.01) | |
| *A43B 13/04* | (2006.01) | |
| *A43B 13/14* | (2006.01) | |
| *A43B 13/18* | (2006.01) | |
| *B32B 3/10* | (2006.01) | |

(Continued)

(52) U.S. Cl.
CPC ............ *A43B 13/026* (2013.01); *A43B 13/04* (2013.01); *A43B 13/141* (2013.01); *A43B 13/187* (2013.01); *B32B 3/10* (2013.01); *B32B 5/18* (2013.01); *B32B 7/022* (2019.01); *B32B 2250/03* (2013.01); *B32B 2250/44* (2013.01); *B32B 2266/025* (2013.01);
(Continued)

(58) Field of Classification Search
CPC .... A43B 13/026; A43B 13/187; A43B 13/141
USPC .......................................................... 36/28
See application file for complete search history.

(56) References Cited

U.S. PATENT DOCUMENTS

| | | |
|---|---|---|
| 4,534,124 A | 8/1985 | Schnell |
| 4,561,195 A | 12/1985 | Onoda et al. |

(Continued)

FOREIGN PATENT DOCUMENTS

| | | |
|---|---|---|
| CN | 111875872 A | 11/2020 |
| EP | 2462827 A2 | 6/2012 |

(Continued)

OTHER PUBLICATIONS

Ymus, "Ymus-(Fortune Art) Beads Factory Introduction", Dec. 2016, 10 pages.

(Continued)

*Primary Examiner* — Timothy K Trieu
(74) *Attorney, Agent, or Firm* — Edell, Shapiro & Finnan, LLC

(57) ABSTRACT

A sole structure for an article of footwear includes a transition region between two sole structure layers. The transition region includes a curved portion having a geometry defined by a portion of an ellipse. A plate which includes the curved portion can be provided between the two sole structure layers. The sole structure enhances the roll acceleration of the article of footwear during use.

8 Claims, 12 Drawing Sheets

(51) Int. Cl.
   *B32B 5/18*   (2006.01)
   *B32B 7/022*  (2019.01)
(52) U.S. Cl.
   CPC ............... *B32B 2266/0257* (2013.01); *B32B 2307/7376* (2023.05); *B32B 2437/02* (2013.01)

(56) References Cited

U.S. PATENT DOCUMENTS

| | | | |
|---|---|---|---|
| 4,651,445 | A | 3/1987 | Hannibal |
| 4,815,221 | A | 3/1989 | Diaz |
| 4,854,057 | A | 8/1989 | Misevich et al. |
| 4,858,338 | A | 8/1989 | Schmid |
| 4,878,300 | A | 11/1989 | Bogaty |
| 5,052,130 | A | 10/1991 | Barry et al. |
| 5,185,943 | A | 2/1993 | Tong et al. |
| 5,191,727 | A | 3/1993 | Barry et al. |
| 5,315,769 | A | 5/1994 | Barry et al. |
| 5,528,842 | A | 6/1996 | Ricci et al. |
| 6,231,946 | B1 | 5/2001 | Brown, Jr. et al. |
| 6,295,741 | B1 | 10/2001 | Kita |
| 6,477,791 | B2 | 11/2002 | Luthi et al. |
| 6,857,205 | B1 | 2/2005 | Fusco et al. |
| 6,968,635 | B2 | 11/2005 | Meschan |
| 7,886,461 | B2 | 2/2011 | Sato |
| 7,934,327 | B2 | 5/2011 | Gebhard |
| 7,941,940 | B2 | 5/2011 | Teteriatnikov et al. |
| 8,171,656 | B2 | 5/2012 | Salminen et al. |
| 8,173,717 | B2 | 5/2012 | Jacobs et al. |
| 8,227,521 | B2 | 7/2012 | Jacobs et al. |
| 8,381,416 | B2 | 2/2013 | Geer et al. |
| 8,567,093 | B2 | 10/2013 | Sato |
| 8,732,981 | B2 | 5/2014 | Cobb |
| 8,776,397 | B2 | 7/2014 | Borel et al. |
| 8,871,823 | B2 | 10/2014 | Witten et al. |
| 8,984,775 | B2 | 3/2015 | Dombrow et al. |
| 9,055,784 | B2 | 6/2015 | Peyton |
| 9,456,658 | B2 | 10/2016 | Bruce et al. |
| 9,462,850 | B2 | 10/2016 | Dirsa et al. |
| 9,629,413 | B2 | 4/2017 | Stien |
| D799,801 | S | 10/2017 | da Costa Pereira Machado |
| 9,781,970 | B2 | 10/2017 | Wardlaw et al. |
| 9,781,974 | B2 | 10/2017 | Reinhardt et al. |
| 9,788,598 | B2 | 10/2017 | Reinhardt et al. |
| 9,788,606 | B2 | 10/2017 | Reinhardt et al. |
| 9,795,186 | B2 | 10/2017 | Reinhardt et al. |
| 9,820,528 | B2 | 11/2017 | Reinhardt et al. |
| 9,901,137 | B2 | 2/2018 | Iuchi et al. |
| 9,913,510 | B2 | 3/2018 | Davis et al. |
| 9,930,927 | B2 | 4/2018 | Luedecke et al. |
| 9,963,566 | B2 | 5/2018 | Baghdadi |
| 9,968,160 | B2 | 5/2018 | Peyton |
| 10,010,137 | B2 | 7/2018 | Foxen |
| 10,271,614 | B2 | 4/2019 | Huard et al. |
| 10,349,700 | B2 | 7/2019 | Amis et al. |
| 10,441,027 | B2 | 10/2019 | Bartel et al. |
| 10,448,704 | B2 | 10/2019 | Dupre et al. |
| 10,548,368 | B2 | 2/2020 | Bartel et al. |
| 10,631,591 | B2 | 4/2020 | Chambers et al. |
| 10,645,994 | B2 | 5/2020 | Avar et al. |
| 10,675,792 | B2 | 6/2020 | Jacobs |
| 10,730,259 | B2 | 8/2020 | Kurtz et al. |
| 10,743,606 | B2 | 8/2020 | Bartel et al. |
| 10,743,607 | B2 | 8/2020 | Amis et al. |
| 10,743,611 | B2 | 8/2020 | Rennex |
| 10,758,001 | B2 | 9/2020 | Case et al. |
| 10,765,172 | B2 | 9/2020 | Foxen |
| 10,798,992 | B2 | 10/2020 | Bartel et al. |
| 10,843,429 | B2 | 11/2020 | Falken |
| 10,925,347 | B2 | 2/2021 | Smith et al. |
| 10,982,066 | B2 | 4/2021 | Minnich et al. |
| 10,982,067 | B2 | 4/2021 | Baghdadi et al. |
| 2001/0034390 | A1 | 10/2001 | Okubo et al. |
| 2002/0184793 | A1 | 12/2002 | Sato |
| 2011/0092648 | A1 | 4/2011 | Lu et al. |
| 2012/0180344 | A1 | 7/2012 | Crowley et al. |
| 2012/0198723 | A1* | 8/2012 | Borisov .............. A43B 7/147 36/91 |
| 2014/0075777 | A1 | 3/2014 | Bruce et al. |
| 2014/0259329 | A1* | 9/2014 | Watkins .......... B29C 37/0025 264/492 |
| 2015/0107132 | A1 | 4/2015 | Takeshita |
| 2015/0143715 | A1 | 5/2015 | Auger et al. |
| 2017/0095034 | A1 | 4/2017 | Dupre et al. |
| 2018/0116335 | A1 | 5/2018 | Worobets et al. |
| 2018/0132564 | A1 | 5/2018 | Bruce et al. |
| 2018/0153254 | A1 | 6/2018 | Fusco et al. |
| 2018/0184757 | A1* | 7/2018 | Bartel .............. A43B 13/189 |
| 2019/0061211 | A1 | 2/2019 | Luo et al. |
| 2019/0365030 | A1 | 12/2019 | Chambers et al. |
| 2019/0365033 | A1 | 12/2019 | Chambers et al. |
| 2019/0373982 | A1 | 12/2019 | Dupre et al. |
| 2019/0382546 | A1 | 12/2019 | Cocquet et al. |
| 2019/0382572 | A1 | 12/2019 | Matayoshi et al. |
| 2020/0002498 | A1 | 1/2020 | Luo et al. |
| 2020/0002499 | A1 | 1/2020 | Luo et al. |
| 2020/0046067 | A1 | 2/2020 | Yamade |
| 2020/0121021 | A1 | 4/2020 | Bartel et al. |
| 2020/0189155 | A1 | 6/2020 | Luo et al. |
| 2020/0229537 | A1 | 7/2020 | Chambers et al. |
| 2020/0281314 | A1 | 9/2020 | Stockbridge et al. |
| 2021/0016531 | A1 | 1/2021 | Kurtz et al. |
| 2021/0076772 | A1 | 3/2021 | Baghdadi et al. |
| 2021/0078275 | A1 | 3/2021 | Baghdadi et al. |
| 2021/0078276 | A1 | 3/2021 | Baghdadi et al. |
| 2021/0079186 | A1 | 3/2021 | Baghdadi et al. |
| 2021/0079187 | A1 | 3/2021 | Baghdadi |
| 2021/0079188 | A1 | 3/2021 | Baghdadi et al. |
| 2021/0101320 | A1 | 4/2021 | Luo et al. |
| 2022/0202137 | A1* | 6/2022 | Kiss .................. A43B 13/20 |
| 2023/0210213 | A1* | 7/2023 | Dojan ............... A43B 13/12 36/28 |
| 2023/0226759 | A1* | 7/2023 | Dunning .......... A43B 13/026 264/241 |

FOREIGN PATENT DOCUMENTS

| | | |
|---|---|---|
| ES | 2 595 039 T3 | 12/2016 |
| GB | 2529140 B | 9/2016 |
| JP | 5042036 B2 | 10/2012 |
| TW | 201801939 A | 1/2018 |
| WO | 2000041544 A2 | 7/2000 |
| WO | 2002/012379 A1 | 2/2002 |
| WO | 201468169 A1 | 5/2014 |
| WO | 2014/188183 A1 | 11/2014 |
| WO | 2014/188188 A1 | 11/2014 |
| WO | 2014/188192 A1 | 11/2014 |
| WO | 2014196387 A1 | 12/2014 |
| WO | 2015177571 A1 | 11/2015 |
| WO | 2019/097178 A1 | 5/2019 |
| WO | 2019/127182 A1 | 7/2019 |
| WO | 2020008133 A1 | 1/2020 |
| WO | 2020188211 A1 | 9/2020 |

OTHER PUBLICATIONS

Zotefoams, "Foam Materials", 0050/Corporate/English/May 12, 2000, 12 pages.

* cited by examiner

SOLE STRUCTURE FOR AN ARTICLE OF FOOTWEAR HAVING ENHANCED ROLL ACCELERATION

CROSS-REFERENCE TO RELATED APPLICATION

The present application claims priority as a nonprovisional from U.S. Provisional Patent Application Ser. No. 63/418,059, filed Oct. 21, 2022, the disclosure of which is hereby incorporated by reference in its entirety.

FIELD OF THE INVENTION

The present invention relates to an article of footwear and, in particular, a sole structure for an article of footwear designed for flexibility, resiliency and enhanced roll acceleration of the foot combined with comfort to a user, particularly a runner.

BACKGROUND

Articles of footwear typically include an upper and a sole structure attached to the upper. For example, athletic footwear typically includes an upper secured (e.g., via adhesive and/or stitching) to a sole structure, which can include a midsole and an outsole. The midsole typically provides some level of cushioning to a user depending upon a particular use. The outsole is typically provided to engage the surface upon which the user is walking or running, where the outsole is also designed with some level of abrasion resistance to withstand some degree of wear during use. The outsole is also typically designed to be a harder material in relation to the more cushioned midsole.

A variety of different sole structure configurations having varying designs and degrees of cushion, flexibility and rigidity are known, where the different configurations can be designed depending upon the terrain in which the footwear is used as well as a particular user activity (e.g., walking, running/jogging, hiking, etc.). For example, a runner typically desires a shoe that provides comfort to the user's foot while ensuring adequate cushioning and flexibility to prevent foot injuries and/or enhance user performance for a particular running activity. For example, for long distance (e.g., marathon) runners, it is desirable to use a shoe including a sole structure that can provide sufficient cushioning and resiliency to protect the runner's foot during impact with the ground surface (often a pavement or other hard surface). However, the outsole is also necessary to reduce wear and enhance longevity of the shoe during use. Therefore, a trade-off can exist between providing adequate resiliency, comfort and protection to the runner while also providing sufficient hardness and abrasion resistance to the sole structure so as to enhance long term use of the shoe.

In addition, for certain types of running shoes for athletic sporting events, such as sprinting or other running events for distance/time, it is desirable to have a suitable spring action and enhanced acceleration during the roll of the foot in each contact with the ground (e.g., heel-to-toe strike).

Accordingly, it would be desirable to provide an article of footwear (e.g., for running and/or other athletic activities) including a sole structure that maintains adequate cushioning, flexibility and comfort to the user while also enhancing the natural gait cycle (heel-to-toe strike) with enhanced foot roll acceleration of the user during foot movements as well as providing adequate ground surface contact protection against wear and tear of the sole structure.

SUMMARY OF THE INVENTION

In example embodiments, a plate for a sole structure comprises a curved portion having a geometry defined by a portion of an ellipse, wherein the ellipse has an aspect ratio from about 1.1 to about 1.9.

In other example embodiments, a sole structure comprises a first layer, a second layer, and a plate disposed between the first layer and the second layer, the plate comprising a curved portion having a geometry defined by a portion of an ellipse, where the ellipse has an aspect ratio from about 1.1 to about 1.9.

In further example embodiments, an article of footwear comprises a sole structure with a plate as described herein.

The above and still further features and advantages of the present invention will become apparent upon consideration of the following detailed description of specific embodiments thereof.

BRIEF DESCRIPTION OF THE DRAWINGS

Like reference numerals have been used to identify like elements throughout this disclosure.

DETAILED DESCRIPTION

Figure 1:
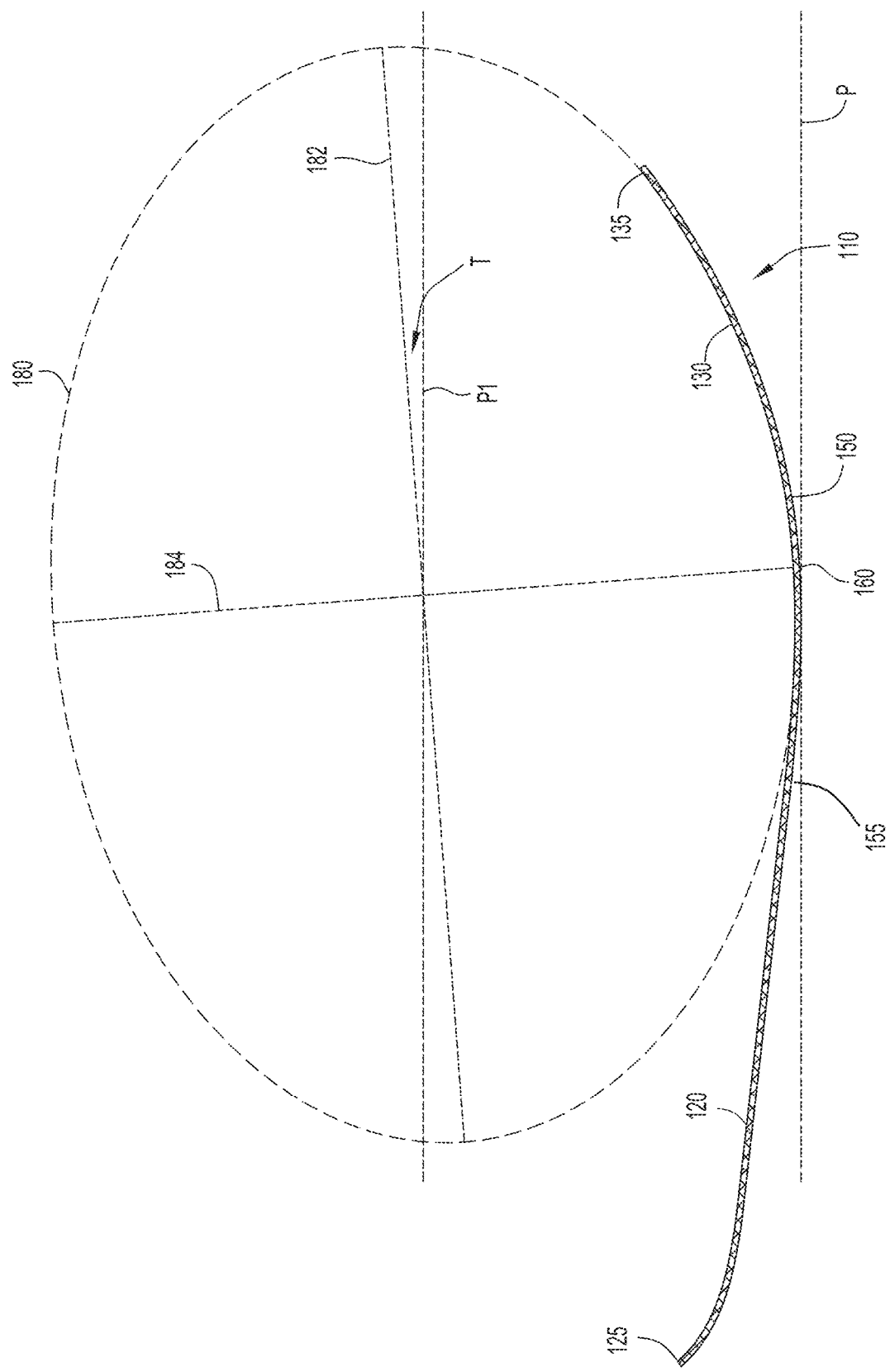
FIG. 1 is a view of a sole plate for integration with a sole structure in an article of footwear in accordance with embodiments described herein.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

As described herein with reference to the example embodiments, an article of footwear and, in particular, an athletic shoe, is provided with a sole structure constructed to provide an enhanced heel-to-toe strike for the user's foot on each contact of the shoe with the ground. In particular, the sole structure is configured to enhance or increase roll velocity and roll acceleration of the foot along the rolling heel-to-toe strike direction during contact of the shoe with a ground surface.

In an embodiment, the roll velocity/roll acceleration of the athletic shoe can be enhanced by providing a rigid and/or resilient plate in the sole structure (e.g., in the midsole location of the sole structure) of the shoe, where the hard plate has certain physical characteristics as described herein.

The plate can be made of any suitable material having desired stiffness or hardness and can further be suitably flexible along its length for its described purpose. In an embodiment, the plate may possess a flexural modulus value of from about 35 to about 45 at 0° (i.e., in a toe-to-heel or lengthwise dimension of the plate) and/or from about 20 to about 30 at 90° (i.e., in a direction orthogonal to the lengthwise dimension of the plate). Alternatively or in addition to the flexural modulus value, the plate may possess a flexural rigidity value of about 60 to about 78 (at 0°) about 34 to about 52 (at 90°). In embodiments, the plate may be formed of polymer. In other embodiments, the plate is formed of fibers or chips embedded in resin. Some non-limiting examples of the fiber or chip materials that can be used to form the plate include carbon (carbon fiber, e.g., graphite fiber), fiberglass, a polyamide (nylon), and/or aramid fiber. The fibers may possess a diameter of 2-7 μmicrometers. The polymer (either alone or reinforced with fibers/chips) a thermoplastic polyurethane (TPU), and an elastomer comprising block copolymers formed of rigid polyamide blocks and soft polyether blocks (e.g., an elastomer commercially available under the tradename PEBAX). A carbon fiber composite is particularly suitable for forming the plate, since it can achieve a desired hardness and flexibility for the plate while minimizing its thickness. In a specific embodiment, the plate consists of multiple layers of carbon fibers woven together and then impregnated with polymer resin. The fibers and the fiber layers are placed in specific alignment to each other. By way of specific example, each layer may include unidirectional (e.g., parallel) carbon fibers impregnated in a resin (e.g., an epoxy resin). By changing the directional alignment of fibers in the adjacent layers relative to each other, the stiffness and bending characteristics of the plate can be adjusted.

The length of the plate spans substantially the entire length of the midsole. The plate extends from the medial heel zone, forwardly through the arch region and sufficient to underlie the metatarsals and toes. The plate terminates a small amount from the front and heel ends of the midsole. The thickness of the plate can be constant or uniform and can further be in the range from about 0.5 μmm to about 2 μmm (e.g., from about 0.5 μmm to about 1.5 μmm, or from about 0.5 mm to about 1.0 μmm). By way of example, the carbon fiber plate may possess a thickness of about 1.2 μmm. The plate is stiff, but resilient and capable of slight bending when loads are applied during use. The stiffness or hardness of the plate can also be constant or uniform along the length dimension of the plate. Such a material used to form the plate, combined with other features of the plate, provides a suitable spring like resiliency for the sole structure that enhances features of the sole structure and shoe in which the plate is integrated.

The plate is also configured to have a geometry or contour along its surfaces that enhances spring-like features which, when implemented in the sole structure, can enhance the kinematics of the shoe, including increasing roll acceleration and roll velocity of the shoe, for heel-to-toe striking movements of the shoe along a ground surface during use (e.g., running/sprinting and other athletic activities). In particular, the plate has a concave shape along its forward portion (i.e., a portion of the plate that extends beyond the arch of the user's foot in a direction toward the front or toe end of the foot) and the geometry of the concave shape is configured such that the curved portion of the plate has a radius of curvature that conforms or corresponds with a portion of an ellipse.

Figure 3:
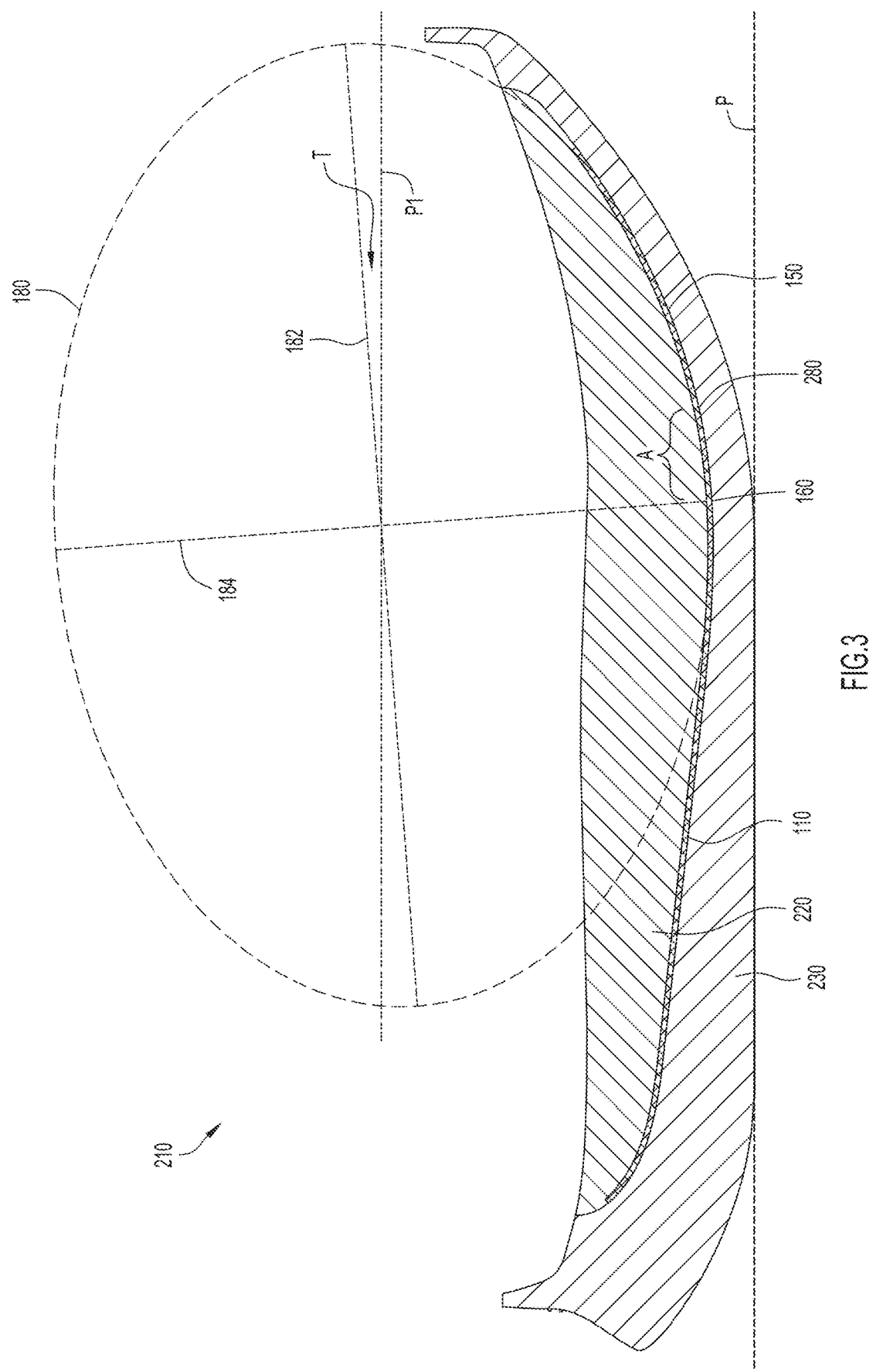
FIG. 3 is a cross-sectional view of the sole structure including the plate of FIG. 2.
Figure 9:
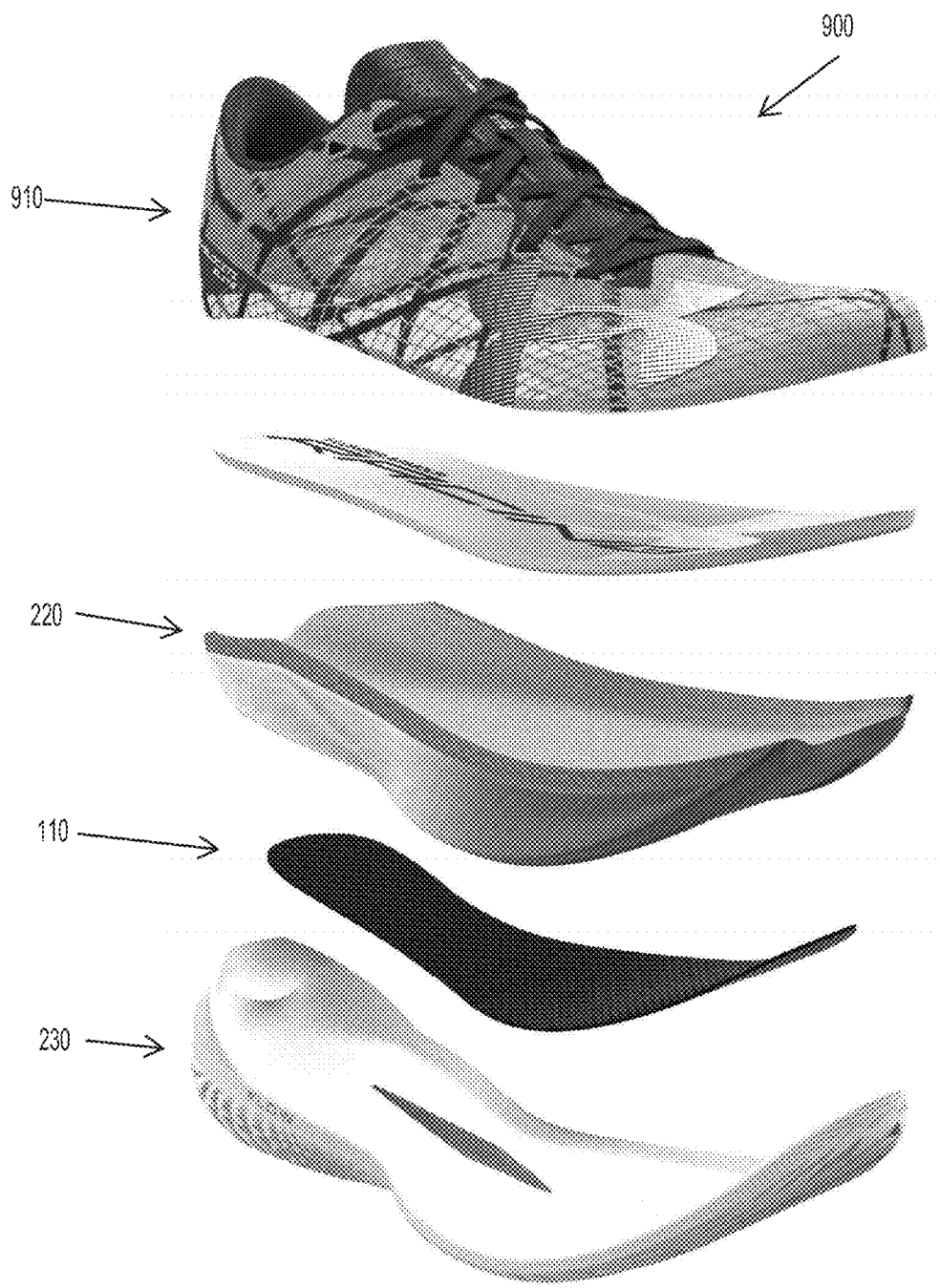
FIG. 9 is an exploded view of an article of footwear incorporating the sole structure of FIG. 1.

Referring to FIG. 1, an example embodiment of a sole plate 110 is depicted including a rear or heel section 120 that corresponds with the heel portion of a shoe (when the sole plate is incorporated into a sole structure of the shoe) and a front or toe section 130 that corresponds with the toe portion of the shoe (as can be seen, e.g., in the embodiment of FIG. 3 described in further detail herein). The rear section terminates in rear or heel edge 125 while the forward section terminates in a front or toe edge 135. As seen best in FIGS. 9A and 9B, the plate 110 rear section 120 is a generally planar portion possessing a width (transverse dimension) that is narrower than the width (transverse dimension) of the forward section 130. Turning again to FIG. 1, the forward section of the plate 110 has a concave curved portion 150 that extends at a location along a lengthwise (i.e., heel-to-toe) dimension of the plate, where the curved portion 150 begins at or beyond the plate's lengthwise midpoint 155 (which, when coupled with or integrated into a sole structure of a shoe, corresponds with the arch of the user's foot) to a location in a direction toward the toe end 130. In the example embodiment depicted in the figures, the curved portion 150 extends to a location that is at or proximate the toe edge 135 of the plate 110. For example, and as shown in the figures, the curved portion 150 extends to the toe edge 135 of the plate 110. Alternatively, in other embodiments, the curved portion can extend to a location that terminates a selected distance from the toe edge 135 of the sole plate. As noted above, the remaining, rearward portion 120 of the sole plate 110 (i.e., portion that extends from the heel edge 125 to the start of the curved portion 150) can be relatively flat or planar. In other embodiments, the rearward portion 120 may possess a degree of curvature along its length or width. However, any curvature of the rearward section 120 of the sole plate 110 differs from the curvature of the curved portion 150 as described herein. As seen best in FIG. 9B, at the transition from the rear section or portion 120 to the forward section or portion 130, in the forward (toe) direction, the width (transverse dimension) of the plate may begin to widen, tapering outward.

An imaginary enclosed boundary line defining an ellipse 180 is also depicted in FIG. 1, with the plot of the ellipse 180 being arranged with the plate 110 such that a portion of the boundary line defining the ellipse 180 extends along and is in substantial correspondence with the curved portion 150 of the plate 110. Thus, it can be seen that the curved portion 150 of the plate 110 has a curvature that defines a portion of an ellipse (i.e., the curved portion 150 lies along the ellipse 180 as shown in FIG. 1, where the ellipse has a major axis 182 and a minor axis 184. The major axis 182 is greater than the minor axis 184 and thus an aspect ratio of the ellipse (defined as major axis divided by minor axis) is greater than 1. The terms "major axis" and "minor axis" in the context of an ellipse are respectively defined as the longest diameter of the ellipse going through its center and the smallest diameter of the ellipse going through its center. As previously noted, any curvature in the remaining portion of the plate 110 differs from the curvature of the curved portion 150 and thus does not align or conform with the ellipse geometry associated with the curved portion 150. The ellipse 180 is plotted or presented along the plate curvature such that the greatest length or major axis 182 of the ellipse is aligned in a similar direction as the lengthwise dimension of the plate 110, while the shortest length or minor axis 184 of the ellipse is aligned in a direction that is transverse the lengthwise dimension of the plate. As described in greater detail in FIG. 3, the plate 110 is incorporated within a sole structure such that the elliptical shape that aligns with and defines the curvature of the curved portion 150 of the plate 110 is tilted a selected degree from a horizontal plane (e.g., from a ground surface upon which the shoe is placed). In addition, a nadir 160 for the plate 110 is defined as the lowest point along the curved portion 150 of the plate when the plate is provided within a sole structure. The nadir 160 defines a starting point of the curved portion 150 as it extends toward the toe end 130 and further is located at or in correspondence with the minor axis 184 of the ellipse 180. In other words, and as shown in FIG. 1, the minor axis 184 of the ellipse 180 intersects the curved portion 150 of the plate 110 at the nadir 160.

The shape or curvature of the plate at this location, combined with the stiffness and resiliency/flexibility of the plate (based upon the plate composition and plate thickness), provides certain spring-like characteristics when incorporated within a sole structure of a shoe so as to enhance rolling (heel-to-toe strike) movements of the shoe during use.

The plate 110 as described herein can be incorporated within a sole structure at any one or more suitable locations. Generally, a sole structure for a shoe includes an upper sole structure midsole region (e.g., a midsole) comprising one or more layers and a lower sole structure region outsole or an outsole region (e.g., outsole) comprising one or more layers, where the outsole region includes a ground-engaging surface that engages the ground when the shoe is worn by a user and the midsole region is located between the outsole region and the upper of the shoe (where the shoe upper encloses or houses the foot of the user wearing the shoe).

Each of the midsole region and the outsole region can include a single layer or a plurality of layers. The layer(s) forming the midsole region can be formed of one or more materials having a hardness (e.g., measured on a Shore A Hardness durometer scale) that is less than the hardness of the layer(s) forming the outsole region. As previously noted herein, the midsole region typically provides some level of cushioning to a user depending upon a particular use, while the outsole region is typically provided to engage the surface upon which the user is walking or running, where the outsole is also designed with some level of abrasion resistance to withstand some degree of wear during use and is therefore a harder material in relation to the more cushioned material(s) forming the midsole region. The sole plate 110 is formed of a harder material (e.g., has a greater Shore A Hardness durometer value) in comparison to the layers of the midsole and outsole regions. Further examples of layers forming the midsole or upper sole structure region and the outsole or lower sole structure region are described in greater detail later herein.

The sole plate 110 can be provided between an upper sole structure layer (e.g., midsole layer) and a lower sole structure layer (e.g., outsole layer), where the upper and lower layers include facing surfaces that engage and substantially conform with the shape (including curved portion 150) of the plate 110.

Figure 2:
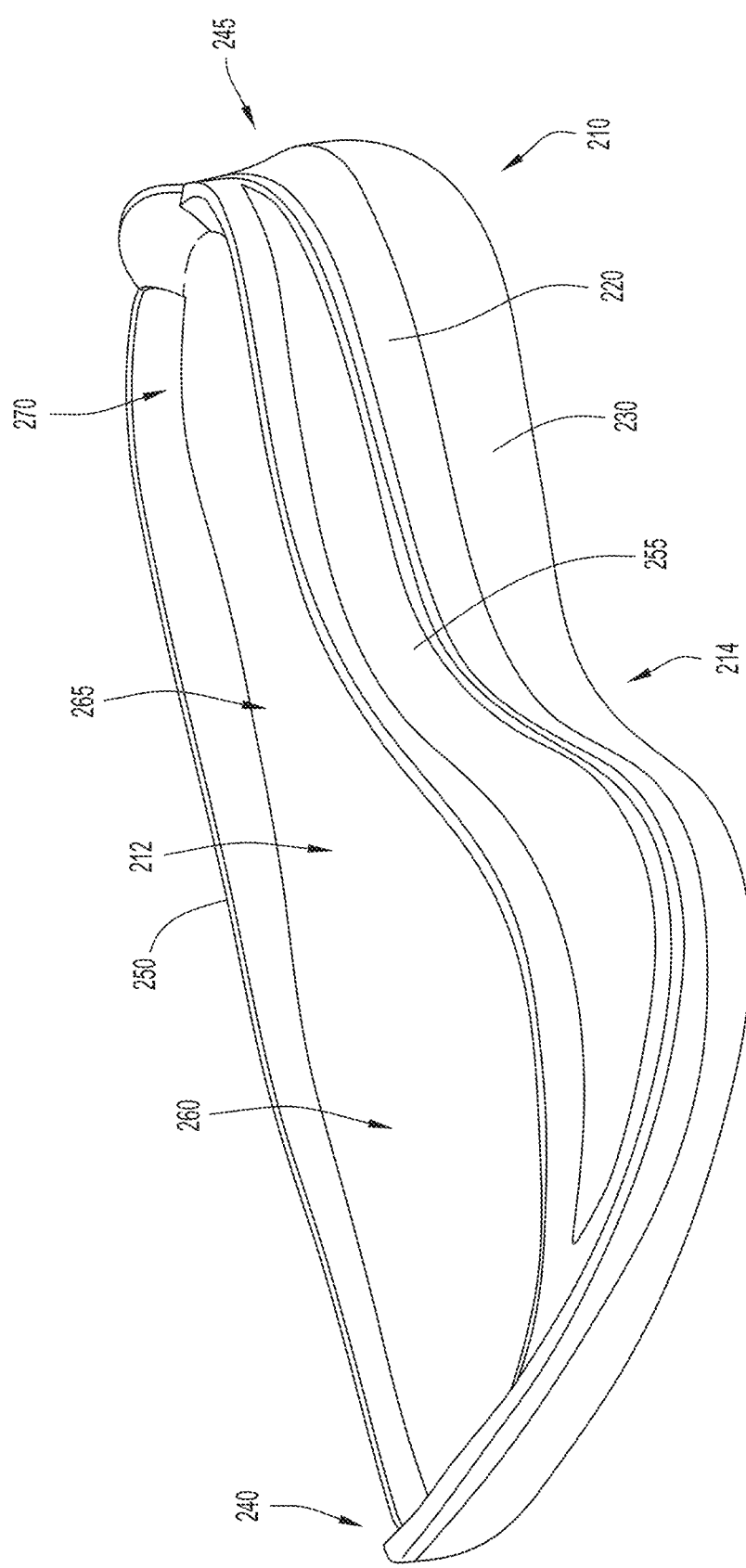
FIG. 2 is a view in perspective of a sole structure for an article of footwear including the sole plate of FIG. 1 and including sole structure layers in accordance with embodiments described herein.

An example embodiment of a sole structure incorporating the sole plate 110 of FIG. 1 is depicted in FIGS. 2 and 3. A sole structure 210 is depicted that, when combined with an upper 910 (FIG. 9) operable to cover a user's foot, forms an article of footwear or shoe 900. The sole structure 210 is formed from a plurality of layers, including at least one midsole or upper layer 220 (a first layer) and at least one outsole or lower layer 230 (a second layer), where the lower layer 230 is harder (as measured using a Shore A or Shore C Hardness durometer scale) in comparison to the upper layer 220. For example, the upper layer 220 can have a Shore A hardness durometer value ranging from 35 to 45 (e.g., Shore A hardness durometer value of 41). The lower layer 230 can have a Shore C hardness durometer value ranging from 45 to 55 (e.g., Shore C hardness durometer value of 50), or a Shore A hardness durometer value ranging from 80 to 90 (e.g., Shore A hardness durometer value of 85).

Referring to FIG. 2, the sole structure 210 includes a top side 212, which connects with an upper (not shown), and a bottom side 214 that engages with the ground surface when the shoe is worn and used (e.g., for running or other athletic activities). The sole structure 210 further includes a front or toe end 240 that corresponds with the toe end of the user's foot when the shoe is worn, a rear or heel end 245 that corresponds with the heel of the user's foot when the shoe is worn, an outward or lateral side 250 that is oriented along the lateral or little toe side of the user's foot when the shoe is worn, and an inward or medial side 255 that is oriented along the medial or big toe side of the user's foot when the shoe is worn. The heel end 245 of the sole structure 210 has a curved shape that combines with a curved heel end of an upper to define a heel cup that generally conforms with the user's heel and extends between the lateral and medial sides 250, 255 of the sole structure 210, upper and shoe. While the example embodiments depicted in the figures show a sole structure for a shoe configured for a right foot, it is noted that the same or similar features can also be provided for a sole structure for a shoe configured for a left foot (where such features of the left footed shoe are a reflection or are "mirror image" symmetrical in relation to the right footed shoe).

Each of the shoe and corresponding sole structure 210 further includes a forefoot region 260 that generally aligns with the ball/metatarsal bones and toes of a user's foot (i.e., when a user is wearing the shoe), a midfoot region 265 that generally aligns with the arch and instep areas of the user's foot, and a hindfoot region 270 that generally aligns with the heel and ankle areas of the user's foot. As can be seen from the cross-sectional view of FIG. 3, the upper layer 220 and the lower layer 230 each extend the full length (i.e., between heel end and toe end) of the sole structure 210. The upper layer 220 and lower layer 230 of the sole structure 210 can have the same or different thicknesses at the forefoot region 260, midfoot region 265 and/or hindfoot region 270 (e.g., where one or both of the layers varies in thickness along the lengthwise or heel-to-toe dimension of the sole structure).

Referring to FIG. 3, the sole plate 110 is located between the upper layer 220 and the lower layer 230, and the plate 110 has a length that generally corresponds with the length of the sole structure 210. The elliptical geometry or shape of the curved portion 150 of the plate 110 integrated between the upper layer 220 and lower layer 230 is indicated by the imaginary boundary line forming an ellipse 180 (as shown in FIG. 1). The plate 110 is situated or provided within the sole structure 210 and between the upper and lower layers 220, 230 such that the nadir 160 of the plate 110 (defined as the lowest point of the plate when the plate is coupled with or integrated within the sole structure, where the nadir is in correspondence with the minor axis 184 of the ellipse 180) is located between the heel end 120 of the sole structure 210 and a location defined as the metatarsal phalangeal joint (MPJ) location 280 along the sole structure. The MPJ location 280 corresponds with the metatarsal head/metatarsal bones of the user's foot (i.e., the ball of the user's foot) when a shoe including the sole structure 210 is worn by the user. Thus, the nadir 160 of the sole plate 110 is located behind (based upon a toe-to-heel direction) and a selected distance A from the MPJ location 280 of the sole structure 210. The distance A at which the nadir 160 is located behind and from the MPJ location 280 (i.e., the nadir is closer to the heel end of the sole structure) can vary based upon a particular application as well as the size of the shoe. In non-limiting examples, the distance A can range from about 10 μmm to about 40 μmm, such as from about 20 μmm to about 30 μmm, or from about 22 μmm and 28 μmm (e.g., about 26 μmm). The nadir 160 of the plate 110 acts as a fulcrum to facilitate enhanced rolling of the shoe during use of the shoe (e.g., running). This is due to the initiation of the plate curvature at the curved portion 150 being located ahead or in advance of the MPJ location 280 corresponding with metatarsal head of the user's foot making contact with the ground surface during heel-to-toe striking movements of the shoe.

The plate 110 is also incorporated within the sole structure 210 such that the curved portion 150 of the plate corresponds with a portion of the shape of the ellipse 180 where the ellipse is slightly tilted from a horizontal plane that is parallel with the ground surface upon which the sole structure 210 is supported. In particular, the major axis 182 of the ellipse 180 which corresponds with the curved portion 150 of the plate 110 is offset or transverse the ground surface or horizontal plane P (as indicated by imaginary line P1, which is parallel with line P) by a selected tilt angle T. The tilt angle can vary based upon a particular application as well as the size of the shoe. In non-limiting examples, the tilt angle T can vary from about 2 degrees to about 10 degrees from the horizontal (the horizontal being defined by a plane that is parallel with a ground surface that supports the sole structure and shoe which incorporates the sole structure), such as about 2 degrees to about 6 degrees from the horizontal, or about 4 degrees from the horizontal.

The curved portion 150 of the sole plate 110 can further be adjusted so that the ellipse 180 corresponding with the curved portion 150 has an aspect ratio (defined by ratio of major axis to minor axis) ranging from about 1.1 to about 1.9, such as from about 1.2 to about 1.7, or from about 1.3 to about 1.6 (e.g., an aspect ratio of about 1.3, about 1.4, about 1.5, or about 1.6).

Without being bound to a particular theory, the elliptical curvature is believed to increase forward rocker motion when transitioning from the stance to the propulsive phases, increasing gait efficiency over longer runs. The combination of features of the plate, including hardness and resiliency of the plate, materials of construction for the plate (e.g., carbon fiber plate), geometry or elliptical curvature features of the curved portion of the plate (including aspect ratio of elliptical curvature and degree of tilt of elliptical curvature from horizontal/ground surface), and location of the curved portion for the plate when incorporated within a sole structure (e.g., setting distance A between nadir of plate and MPJ location of sole structure), provide enhance forward roll speed and acceleration performance characteristics for the shoe, where each of these features can be adjusted individually or in combination with other of these features to enhance the performance characteristics of the shoe in some manner for a particular application. Implementation of the plate in the manner described herein in a sole structure for a shoe results in enhanced performance characteristics including a faster "roll-off" of the shoe from heel to toe strike so as to increase roll speed and roll acceleration of the shoe during use. For example, the roll speed of the shoe can be measured in degrees per second, which provides an indication of ability of the shoe to rotate to a greater degree or a faster acceleration rate, where increase in roll acceleration also causes a much greater increase in roll speed thus enhancing shoe performance for athletic activities (e.g., running or sprinting).

Further enhancement of shoe performance can also be implemented based upon materials used to form the upper and lower layers between which the sole plate is located.

In certain embodiments, and depending upon a particular application for the shoe, the midsole region can be formed of one or more layers comprising a softer, foam or similar material, while the outsole region can be formed of one or more layers comprising a harder, rubber or other similar polymer material. For example, the upper (first layer) may be formed of one or more materials including, without limitation, ethylene vinyl acetate (EVA), an EVA blended with one or more of an EVA modifier, a polyolefin block copolymer, and a triblock copolymer, and a polyether block amide (e.g., a material commercially available under the tradename PEBAX). The outsole may be formed of one or more materials including, without limitation, elastomers (e.g., thermoplastic polyurethane), siloxanes, natural rubber, and synthetic rubber.

In other embodiments, and depending upon a particular application for the shoe, each of the upper (first) layer, which defines a midsole region, and the lower (second) layer, which defines an outsole region, can be formed of a foam material (where the foam material of the lower layer is harder in relation to a softer, more cushioning material of the upper layer). In a non-limiting embodiment, a layer for each of the upper layer or midsole region and lower layer or outsole region is formed of a supercritical (SC) foam utilizing techniques as described, e.g., in co-pending U.S. patent application Ser. No. 18/148,569, the disclosure of which is incorporated herein by reference in its entirety. Generally, the term "supercritical foam" or "SC foam" refers to a foam material that is formed using a physical foaming agent (and not a chemical foaming agent). In the supercritical (SC) formation process, in which a raw or intermediate material (e.g., beads, pellets, or a blank or solid preform material) is subjected to a supercritical (SC) fluid under high temperature and/or high pressure to cause the raw or intermediate material to form a foam structure that is filled with voids, is lightweight and of low density. One or more fluids can be used in the SC forming process including, without limitation, carbon dioxide, nitrogen and a combination thereof ($CO_2$ and $N_2$).

In an example embodiment, a polymer is placed in a mold, where a supercritical fluid is introduced at a first temperature and at a first pressure for a time period sufficient for the supercritical fluid to impregnate the polymer. The temperature and pressure are then changed to a second temperature and a second pressure sufficient to produce the polymeric foam having a microcellular structure. The high temperature and/or high pressure causes the raw or intermediate material to form a foam structure that is filled with generally uniform voids, is lightweight and of low density. In an embodiment, the void or cell size of the SC foam is less than 100 μmicrons, e.g., less than 10 μmicrons or less than 1 μmicron. For example, the cell size can be in a range from about 0.1 μmicrometer (micron or μm) to about 10 μmicrons, such as from about 0.1 μmicron to about 5 microns. Cell densities, moreover, may be in a range from about $10^9$ to about $10^{15}$ per cubic centimeter of the material.

Conventional polymer foams are primarily manufactured using various foaming processes such as bead, extrusion, injection molding, and batch methods. Standard techniques for producing foam rely on chemical blowing agents and/or crosslinking agents. These processes produce voids or cells within the plastic materials which are relatively large, e.g., on the order of 100 μmicrons or greater. With conventional or microcellular foams, the number of voids per unit volume is relatively low and often there is a generally non-uniform distribution of such cells throughout the foamed material. By way of example, conventional, non-SC foam possesses a cell density of about $10^4$~$10^6$/$cm^3$ and an average cell size of over 100 μmicrons (microcellular size). Such materials tend to have relatively low mechanical strength; moreover, such traditional, cross-linked foam material is non-biodegradable, requires a high amount of energy to produce, and emits VOCs.

In contrast, supercritical (SC) foam is formed by using supercritical fluids, i.e., gases in their supercritical state, which supercritical fluids are supplied to the materials to be foamed. The supercritical fluid is used as the foaming agent in a parent material, preferably, for example, in a polymer plastic material. Specifically, the supercritical fluid saturates the polymer without the need to raise the saturation temperature of the process to the melting point of the polymer. The resulting foamed material can have a cell density of several-hundred-trillion voids per cubic centimeter and an average void or cell size that is microcellular (cell size below 100 μm), ultramicrocellular or supermicrocellular (cell size between 0.1-1 μm), or nanocellular (cell size below 0.3 or 0.1 μm).

For example, foam material prepared by supercritical fluid foaming technology generally has a cell density of $10^9$ to $10^{15}$ cells/$cm^3$ and a cell size of less than 1.0 μmicron and/or less than 0.1 μmicron).

The polymer materials used to form one or more layers for each of the midsole and outsole regions can be formed of the same or different polymer materials and/or can be formed utilizing the same or different foam forming process. Each of the upper and lower foam layers can be formed from one or any combination of polymers (e.g., block copolymers), such as one or more selected from the group consisting of ethylene vinyl acetate (EVA), olefins (e.g., olefin block copolymers that can include, without limitation, $C_3$-$C_{20}$ olefins, or $C_3$-$C_{10}$ olefins such as propylene, butene, pentene, hexene, heptene and octene), and polyamides.

In example embodiments, the sole structure comprises a midsole or upper layer and an outsole or lower layer, both formed of one or more SC foam materials. In this embodiment, the sole plate can be disposed between the upper/midsole layer and the lower/outsole layer. The upper layer can be formed from a raw material or raw composition that comprises a polyamide polymer such as a block copolymer formed of polyamide and polyether blocks at a suitable ratio that forms the SC foam layer having a specified hardness, a specified density and other desired physical characteristics. A specific but non-limiting example embodiment of a suitable polyamide polymer that comprises some or all of the raw material used to form the SC foam upper layer is a polyamide polyether copolymer commercially available under the tradename PEBAX (Arkema S. A., France), such as PEBAX RNEW 40R53.

In further example embodiments, the lower/outsole layer can be formed from a raw material or raw composition comprising an olefin material (e.g., polyethylene). In particular, the raw material forming the lower layer can comprise an olefin polymer material combined with a silicone polymer material so as to form a ground-contacting and abrasion resistant, cushioning foam material that has a greater hardness (e.g., measured on a Shore A Hardness scale) in comparison to the upper layer. The lower layer can further be formed so as to have a suitable wear/abrasion resistance that functions effectively as an outsole, thus eliminating the requirement for a more dense and harder rubber outsole for the shoe (and thus also reducing overall weight of the sole structure and shoe). In particular, the olefin material provided in the raw material used to form the lower layer can comprise an ethylene/α-olefin block copolymer. Typically, at least about 50 μmol % of olefin block copolymer may include ethylene-containing hard blocks. In some embodiments, the hard blocks may include at least about 95 wt percent ethylene, and may be 100 wt percent ethylene. The ethylene hard blocks may be highly crystalline. The remainder of the olefin block copolymer may be soft blocks of amorphous olefins. Suitable α-olefin fractions include, for example, straight-chain or branched α-olefin having between 3 and about 30 carbon atoms. Cyclo-olefins may also be provided including between 3 and about 30 carbon atoms and di- and poly-olefins having at least 4 carbon atoms. The raw material can also comprise blends of olefin block copolymers. Different compositions may be used to achieve different properties and characteristics, such as hardness, resistance to compression set, or resistance to extremes of hot and cold temperature, in the resultant composition. A non-limiting example of a specific type of olefin block copolymer composition that can be provided in the raw material to form the lower layer 230 is an olefin block copolymer commercially available under the tradename INFUSE (Dow Chemical Company).

The silicone polymer material combined with the olefin material to form the lower layer 230 can comprise silicone rubber that is provided in an amount of about 25 phr (parts per hundred rubber) for the material composition. Minor quantities of other polymers also may be included in this 25 phr of rubbers. Silicone rubber has the general formula [—Si(R1)(R2)—O]m[—Si(R3)(R4)—O]n, where m is between 1 and about 20,000 and n is between 1 and 20,000. Often, differences between silicone rubbers are found in the pendant groups, i.e., R1, R2, R3, and R4. In some embodiments, R1, R2, R3, and R4 each may be individually selected from the group consisting of methyl, phenyl, vinyl, trifluoropropyl, and blends thereof, where at least one of R1, R2, R3, and R4 is vinyl. In some embodiments, R1, R2, R3, and R4 each may be individually selected from the group consisting of an alkyl, and R1, R2, R3, and R4 may be the same alkyl. Other silicone rubber compositions also are available. In some embodiments, the silicone rubber may be a blend of silicone rubbers having different pendant groups.

Thus, in certain embodiments, the upper/midsole layer can comprise a SC foam material (e.g., a SC PEBAX foam material), and the lower/outsole layer also comprises a SC foam material (e.g., SC INFUSE foam material) which is harder than the upper SC foam material. In other embodiments, the upper/midsole layer can comprise a SC foam material (e.g., a SC PEBAX foam material), while the lower/outsole layer comprises a foam material (e.g., non-SC foam) or a non-foam material (e.g., rubber or other suitable polymer) which is harder than the upper SC foam material layer. In still further embodiments, the upper/midsole layer can comprise a foam material (e.g., non-SC foam), and the lower/outsole layer can comprise a SC foam material (e.g., SC INFUSE foam material) that is harder than the upper foam material layer.

Any suitable types of cross-linking agents and pigments can be provided within the layers of the upper/midsole layer(s) and the lower/outsole layer(s) to achieve desired properties as well as aesthetic qualities (e.g., different colors) for the midsole and outsole regions.

Crosslinking agents function to crosslink polymer chains to improve structural integrity and to provide resistance to chemical attack. Cross-linkers are chemical products that chemically form bonds between two hydrocarbons, which may add rigidity to a product. One such cross-linking agent is BIBP, or bis[1-(tert-butylperoxy)-1-methylethyl]benzene. Dicumyl peroxide also may be used as a cross-linking agent. The reaction can release a small amount of heat or absorb that amount of heat depending on the chemical used. For example, for the raw material used to form the layer comprising an olefin block copolymer and silicone rubber, cross-linking agents can be provided in the raw material in an amount between about 0.5 and 3 phr, e.g., between about 1 and about 2 phr.

Pigments (e.g., in the form of fine particulates) can also be provided in one or both compositions used to form the upper foam layer and/or the lower foam layer so as to impart a color to the raw material and resultant foam layer that is formed in the SC foam forming process. Some non-limiting examples of pigments include titanium dioxide and zinc oxide. In example embodiments, an amount of pigments can be provided in the raw material used to form the lower layer 230 can be from about 1 phr to about 10 phr (e.g., from 1 phr to about 4 phr, or from about 1 phr to about 2 phr).

In certain example embodiments, the raw materials provided that form one or both of the upper/midsole and lower/outsole foam layers can include minor amounts of other additives, such as anti-oxidants, viscosity modifiers, fillers, release agents, odor absorbents, and other commonly-used additives. Such additives may be present in any combination and may include other minor additives. Further, one or more anti-static agents can also be provided in the raw materials that form one or both of the upper and lower layers. Anti-static agents may help to minimize attraction of dust to the surface of the polymer or of an object made with the polymer. Anti-static agents fall generally into three types: migratory additives, ionic (both anionic and cationic) conductors, and particulates such as carbon black. Migratory additives tend to improve performance as time after manufacture increases. Carbon blacks and particulates provide limited resistivity to dust. However, ionic conductors typically provide essentially constant performance at a level far superior to carbon blacks. In embodiments of the disclosure, ionic conductors may be used to reduce static. For example, octane-1-sulfonates can be added to the raw material used to form the lower layer at a level from about 5 phr to about 15 phr (e.g., from about 8 phr to about 12 phr). Other counter cations, such as potassium, can also be used in either or both raw materials used to form the upper and lower foam layers.

The composition of the raw material for each of the upper and lower layers can be selectively varied (including changing components and/or amounts/weight percentages of the components) to correspondingly adjust the hardness, wear resistance, coefficient of traction, and other properties and characteristics of each foam layer. For example, the hardness of the lower layer can be made harder by using an olefin block copolymer comprising more hard blocks. Similarly, varying the types of silicone rubbers in the raw material can change the properties and characteristics of the resultant lower layer. Typically, olefin block copolymers are available in a wide range of properties and characteristics, as are silicone rubbers. This, in combination with the SC foam forming processes used to form the layers, allows for adjusting the properties of each layer such that the lower foam layer has a greater hardness than the upper layer and each layer has selected characteristics based upon an intended use of the sole structure in a shoe.

In a specific, non-limiting embodiment, a sole structure is incorporated with a shoe in which the sole structure comprises an upper (e.g., midsole) layer comprising a SC PEBAX material, the sole plate as described herein, and a lower (e.g., outsole) layer comprising a SC INFUSE material.

In still further embodiments, a sole structure can be formed in which an upper layer (e.g., formed of SC PEBAX material) is combined with a lower layer (e.g., a SC INFUSE material), but with no sole plate being provided between the upper and lower layers. Instead, the upper layer and the lower layer include facing surfaces at the boundary between the two layers with complementary contours that define a curved portion substantially similar in curvature as the curved portion 150 described herein for the sole plate 110.

Figure 4:
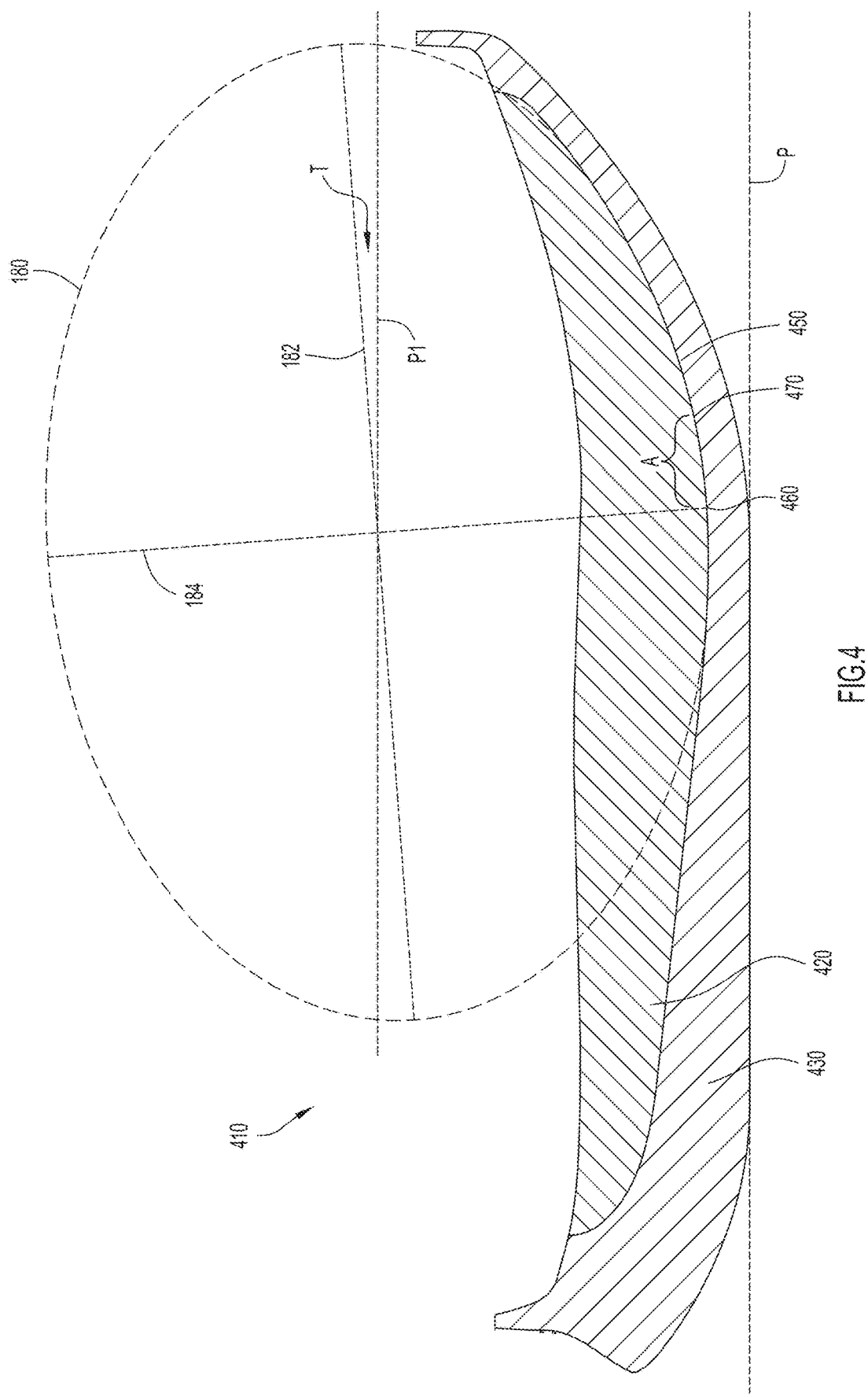
FIG. 4 is a cross-sectional view of another sole structure for an article of footwear in accordance with embodiments described herein.

Referring to FIG. 4, a sole structure 410 includes an upper (e.g., midsole) layer 420 and a lower (e.g., outsole) layer 430, where the upper and lower layers can each be formed of the same or similar types of materials as described herein for the sole structure 210 of FIGS. 2 and 3. Unlike the sole structure 210, the sole structure 410 does not includes a sole plate 110. However, a curved elliptical geometry is defined at the interface between the upper and lower layers, i.e., at the engagement between facing surfaces of the upper and lower layers which have complementary contours. The interface includes a curved portion 450 having a geometry that is the same or substantially similar to the geometry of the plate 110 for sole structure 210, where a nadir 460 at the interface is located a distance A behind a MPJ location 470 of the sole structure 410. A phantom boundary line aligned with the sole structure defines an ellipse 180, where a portion of the ellipse corresponds with the curved portion 450 of the interface. This curved portion 450 defined at the interface of the complementary contoured and engaging surfaces of the upper and lower layers, combined with the materials used to form the upper and lower layers (which provide a suitable hardness to each of these layers), enhances the roll speed/roll acceleration of the shoe during use. While embodiments incorporating the plate can provide a greater spring-like resiliency roll accelerating performance characteristics in comparison to a sole structure that does not include a sole plate, the embodiment of FIG. 4 does enhance roll acceleration due to the surface interface geometry in relation to other sole structures that do not incorporate such geometry at surface layer interfaces.

The embodiments depicted herein of sole structures including two SC foam layers (with or without sole plate disposed between the two SC foam layers) can be formed utilizing any suitable process that generates a SC foam layer having cell sizes and cell densities in the ranges as noted herein utilizing a SC fluid during the process. As previously noted, the sole structure can include two foam layers, where one or both foam layers comprise SC foams. When both layers are formed of SC foam, each foam layer can be formed using the same or similar SC fluid foam formation process. Alternatively, the upper SC foam layer can be formed from a SC fluid foam forming process while the lower SC foam layer is formed utilizing a conventional foam forming process. Stated another way, the first or upper layer may be a supercritical foam and the second or lower layer may be a conventional foam.

An example embodiment of a supercritical fluid (SCF) foam forming process to form at least the first or upper foam layer is now described. Any suitable blowing or foaming agent can be utilized that is capable, at suitably high temperature and pressure, of forming a SCF that produces a cellular structure or voids within the polymer composition during the foaming process when the polymer components undergo a hardening or phase transition during the foaming process. For example, the foaming agent that forms the SCF be converted from a gaseous state (e.g., carbon dioxide, nitrogen and/or steam) to a SCF or a liquid state (e.g., water) to a SCF. A SCF has a critical point at a temperature and pressure at which distinct gas and liquid phases do not exist but at a pressure below that required to convert the fluid to a solid. Some examples of a SCF that can be used in the SC foam forming processes as described herein are water/steam, nitrogen, carbon dioxide, and any combinations or mixtures thereof. Preferably, the SCF used in the SC foam forming processes as described herein is nitrogen, carbon dioxide, or a mixture of nitrogen with carbon dioxide. The SC point of nitrogen is −147° C. and 3.4 MPa, such that compressed nitrogen (or compressed air) above this temperature and pressure will typically yield a SC fluid. The SC point of carbon dioxide is at 31° C. and 7.4 MPa, so that heating and pressurizing carbon dioxide above these thresholds will result in formation of a SCF. Thus, a SCF formed from a combination of $CO_2$ and $N_2$ will be at the elevated temperature (i.e., above ambient temperature) and high pressure that is required to achieve the SC point of $CO_2$.

An example embodiment of a first SC foam forming process, used to form the upper foam layer, is described with reference to the flowchart depicted in FIG. 5 and the schematic views of FIGS. 6A and 6B. In this process, beads are first formed from a raw material using supercritical fluid (SCF) (as shown in FIG. 6A) in a first vessel or reactor, and then the beads are fused together and molded in a separate vessel or mold structure to form the upper layer of the sole structure (as shown in FIG. 6B). At 510, a polymer composition or raw material (material 605 as shown in FIG. 6A) is provided into a batch vessel or batch reactor (reactor 610 as shown in FIG. 6A) that is operable at high temperatures and/or high pressures so as to form and maintain a SCF fluid within the reactor for reaction and/or interaction with the raw material. In an embodiment, the raw material is a thermoplastic elastomer such as PEBAX, which is formed of rigid polyamide and flexible polyether segments. In further embodiments, the supercritical foam layer may be formed of ethylene vinyl acetate polymer, or of other thermoplastic elastomers such as a polyester thermoplastic elastomer.

The raw material can be in the form of a particulate matter (e.g., granules or particles having various sizes and shapes) or in a fibrous form (e.g., a web of nonwoven or intertangled fibrous material). The raw material can be provided already in a colored state (i.e., dye or pigment already added to color the raw material with a desired color), such that no pigment or dye need be added to the raw material to form the foam having a certain color. The beads of raw material formed by being subjected to the SCF are larger in one or more dimensions than the particulate or fibrous form of the raw material prior to such SCF processing. The beads can further have rounded shapes (e.g., spherical/circular cross-sections and/or prolate spheroid/elliptical cross-sections).

At 520, the reactor is heated and/or pressurized to a suitable temperature and pressure and a gas is injected into the reactor (e.g., gas 615 as shown in FIG. 6A) that forms a SCF. For example, when the foaming agent comprises carbon dioxide, the reactor can be heated or set to a temperature of at least 31° C. and a pressure of at least 7.4 MPa such that the carbon dioxide (and nitrogen, if combined with carbon dioxide) is present as a SCF within the reactor. The gas can be injected into the reactor and then transition to a SCF within the reactor (due to the temperature and pressure within the reactor). Alternatively, the gas can initially be converted to a SCF and then injected into the reactor in its SCF state and further maintained therein as a SCF. In the example embodiment depicted in FIG. 6A, a combination of $CO_2$ and $N_2$ are provided to form the SCF used in the bead forming process.

At 530, the SCF interacts with the non-foamed or raw material (e.g., absorbs into the raw material) within the reactor for a suitable residence time period. The article that is foamed may have a regular or irregular shape and may be, for example, a pellet, bead, particle, cylinder, cube, sphere. Pellets, beads, or particles may be generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. Upon decrease of pressure and/or temperature such that the fluid transitions from its SC state to gaseous state, foaming and conversion of the raw material occurs where the raw material is converted from its particulate or fibrous state into rounded or spherical components or beads of a substantially uniform size distribution (e.g., beads 620 as shown in FIG. 6A).

At 540, the beads formed by exposure to the SCF are removed from the reactor and provided in a mold, e.g., a mold 630 as schematically depicted in FIG. 6B. In particular, a mold can comprise two or more structural pieces or mold parts (e.g., parts 630A and 630B as shown in FIG. 6B) with facing sides that are hollowed such that, when pressed together (e.g., in a clamshell or other configuration), the mold parts fuse the beaded material together under heat and pressure to form a single, integral and unitary piece or product. In the example embodiment, steam is provided at 550 (e.g., steam 640 is provided into the mold via inlet and outlet lines) at a suitable temperature (e.g., about 150° C.) and a suitable pressure (e.g., about 3 bar or 0.3 MPa) for a sufficient time period (e.g., for about 2 μminutes) to fuse the beads together within the mold. The steam can then be replaced with water (e.g., at ambient temperature) to cool the fused product, prior to displacing the mold parts from each other and removing the resultant unitary product which forms a SC foam layer 680 (e.g., the upper foam layer 220/420 of the sole structure 100/410).

The resultant product or SC foam layer 680, as a result of fusing beads together in the mold which were formed via a SC fluid foam forming process, has substantially uniformly sized and similarly shaped air gaps, cells or voids throughout the foam layer, which differs from conventional foam products in which voids or cells defined throughout the conventional foam layer can be of significantly differing shapes and sizes. In contrast, the voids within a supercritical foam is substantially uniform with microcellular dimensions (e.g., cell or void diameters) from about 0.1 μmicrometer (micron) to about 10 μmicrons, such as from about 0.1 μmicron to about 5 microns. In particular, partial bead shapes can still be present at exterior surface portions of the upper foam layer. The interior voids or cells formed within and throughout the upper foam layer can further be defined by the curvature or curved shapes of the beads being fused together. The SC foam layer 840 formed by the SC foam forming process also has a lower density than conventional foams, is very lightweight and further has a higher resiliency that provides a high energy return when compressed and decompressed during use in a sole structure for a shoe (e.g., during ground engaging movements of the shoe when the sole structure is pressed and then released by the user's weight against a ground surface).

Figure 5:
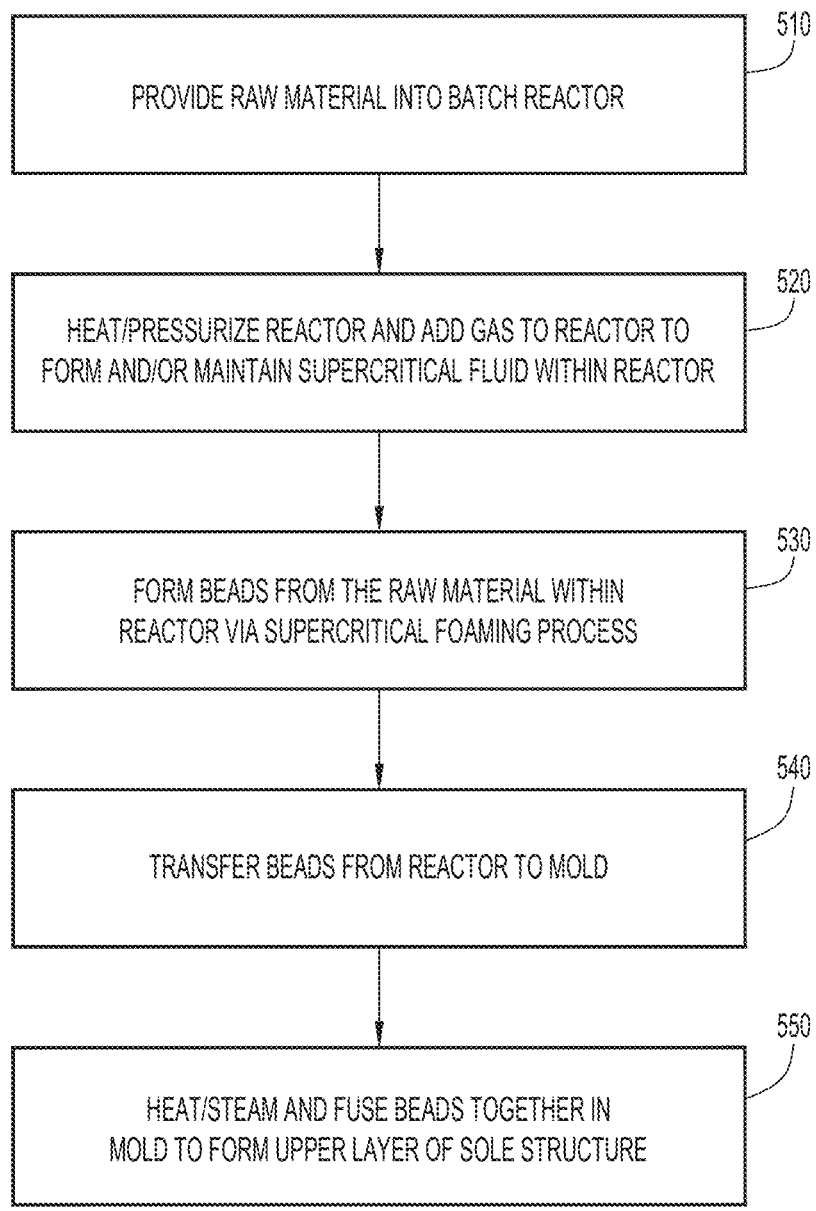
FIG. 5 is a flowchart depicting method steps for an example supercritical foam forming process that forms one or more layers of the sole structure in accordance with an embodiment of the invention.
Figure 6A:
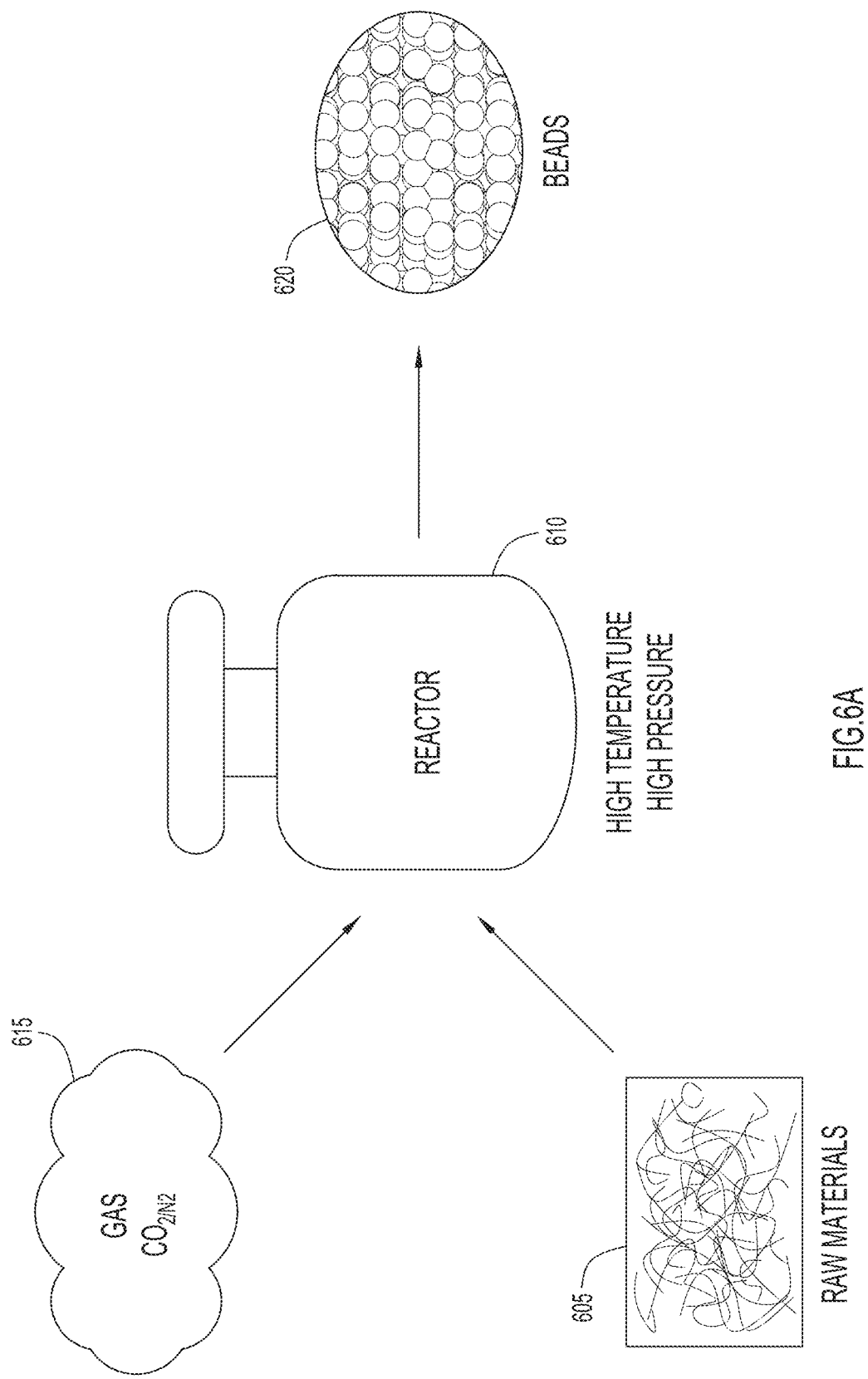
FIGS. 6A and 6B are schematic views showing method steps described in the flowchart of FIG. 5 using a reactor and a mold.
Figure 6B:
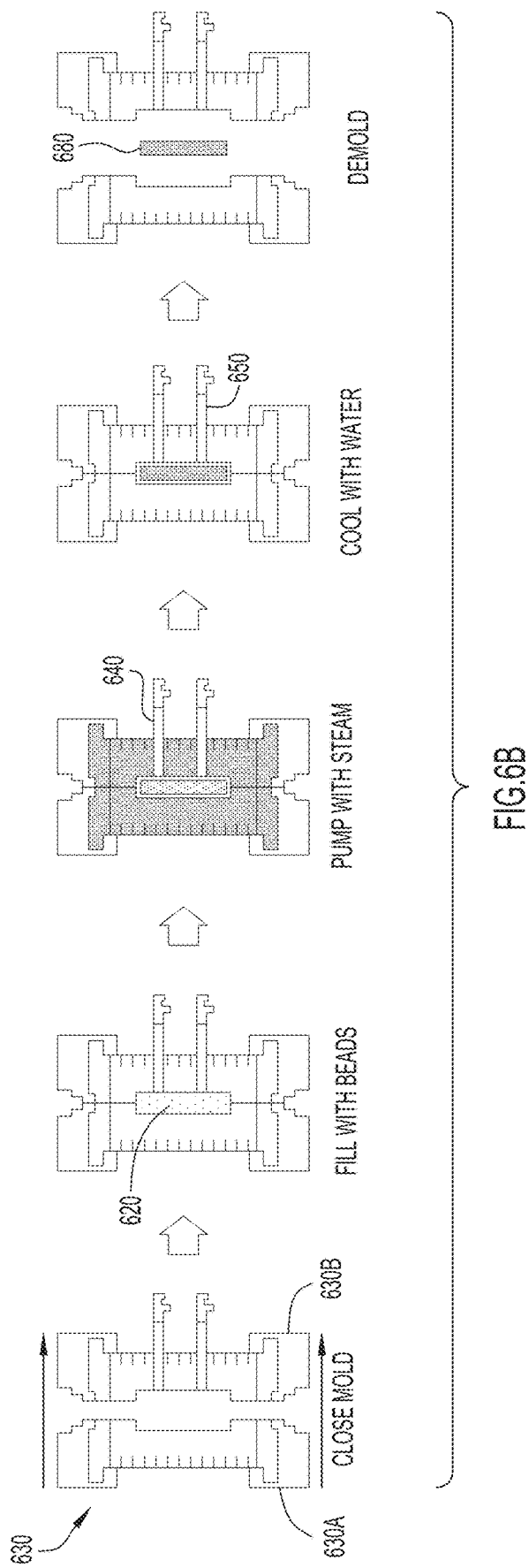
Figure 7:
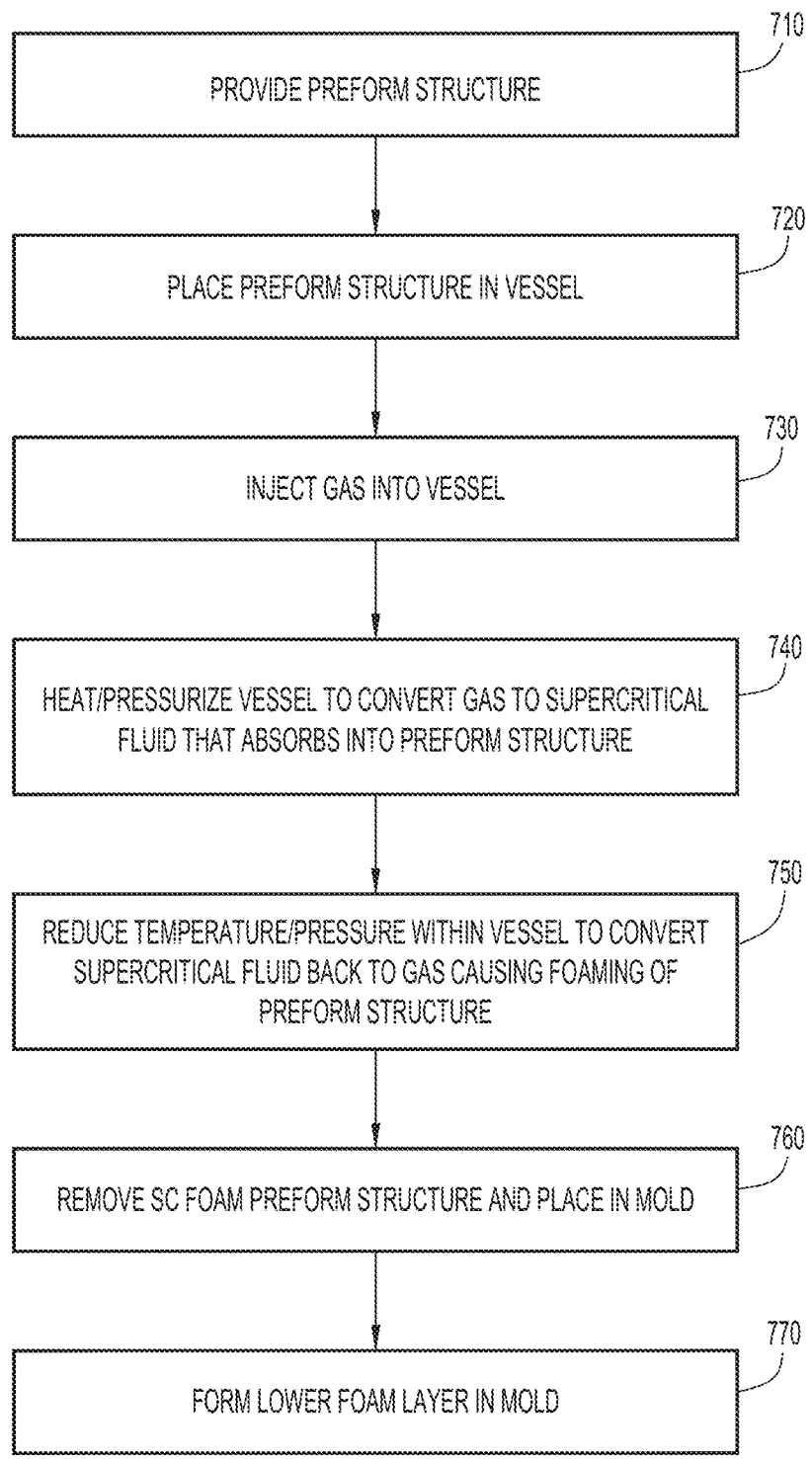
FIG. 7 is a flowchart depicting method steps for another example supercritical foam forming process that forms one or more layers of the sole structure in accordance with an embodiment of the invention.
Figure 8A:
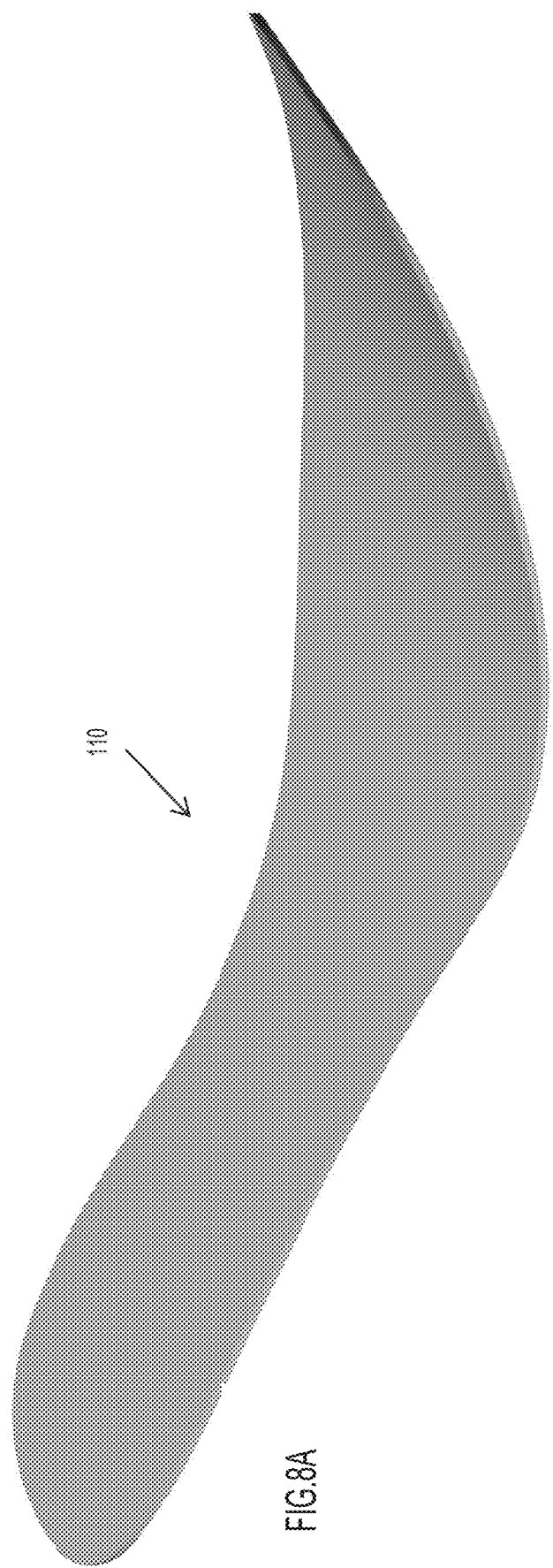
FIG. 8A is a perspective view of the sole plate, in isolation.
Figure 8B:
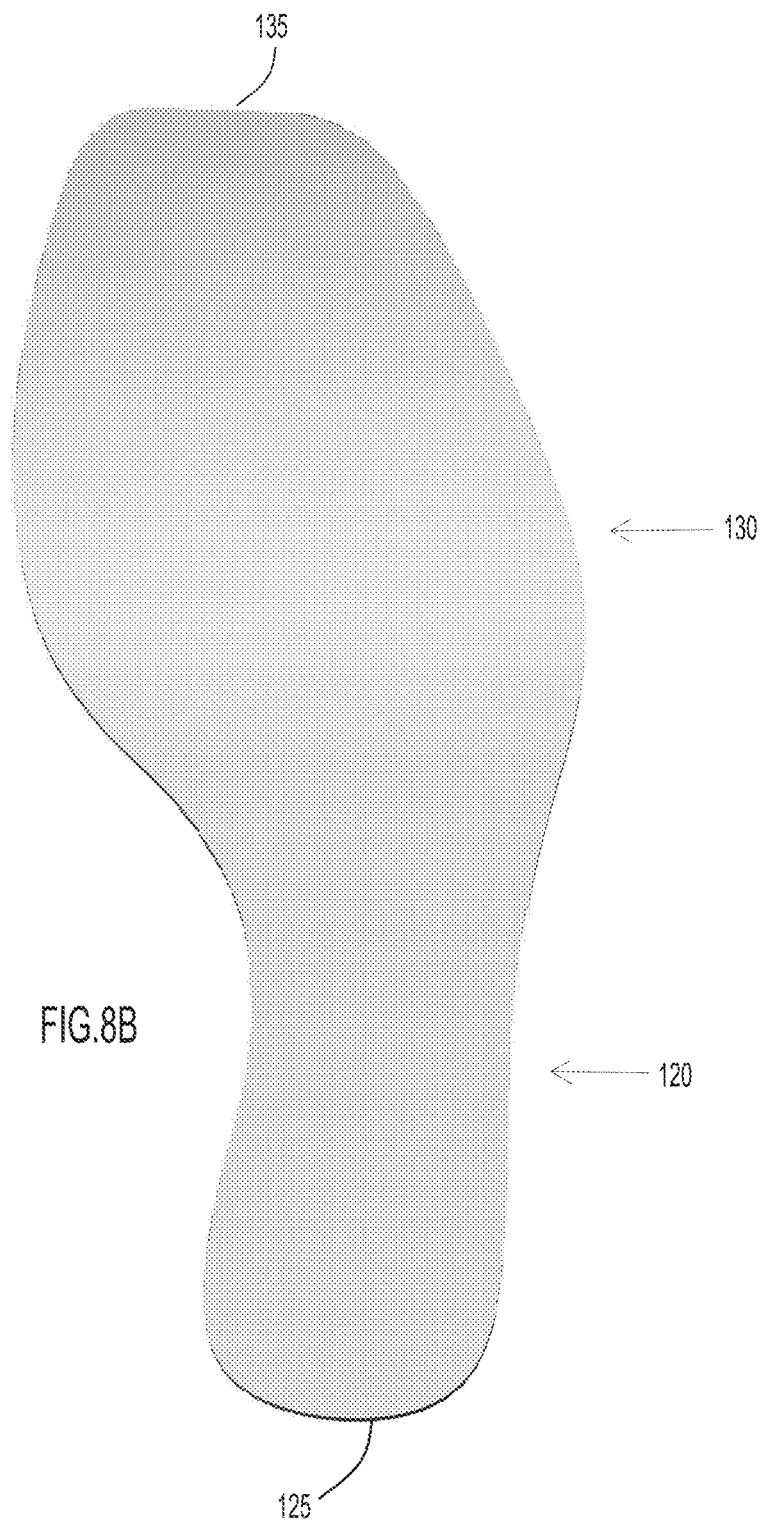
FIG. 8B is a top view of the sole pate, in isolation.

As previously noted, the process as described herein and depicted in FIGS. 5, 6A and 6B can be implemented for forming the upper SC foam layer 220 (or 420) of the sole structure 210 (or 410). While the lower foam layer can be formed in the same or similar manner as the upper foam layer (using the same or a different starting, raw material), this layer can also be formed utilizing a different SC fluid foam forming process or a foam forming process that does not utilize a SCF. An example SCF foam forming process utilized to form the lower foam layer is described with reference to the flowchart of FIG. 7. At 710, a one piece, unitary blank or preform structure or member comprising a raw material, such as an olefin block copolymer (e.g., INFUSE) combined with a silicone polymer, is provided. The raw material can already be colored such that no pigment or dye is added to the raw material in the SCF foam forming process. The preform member can be formed in any suitable manner prior to being subjected to the SCF foaming process. In an example embodiment, the raw material can be provided in particulate form (e.g., pellets) that is melted and injected into a first mold and heated and/or pressurized to form a preform member of the raw material. At 720, the preform member is placed within a suitable vessel (e.g., an autoclave) configured to be pressurized and heated to the suitable temperatures of the SCF. At 730, a fluid, such as $CO_2$ (or a combination of $CO_2$ with $N_2$) can be injected into the vessel, and at 740 the vessel is heated and/or pressurized (e.g., heated to a temperature of at least 31° C. and pressurized to a pressure of at least 7.4 MPa) so as to convert the fluid to a SCF and cause the SCF to interact with the SCF within the vessel (e.g., by absorption of SCF into the preform member, causing its expansion and forming voids within the member).

At 750, after a sufficient time period in which the SCF interacts with the preform member (e.g., saturates the preform member), the pressure and/or temperature within the vessel is reduced below the critical point of the SCF, the SCF converts back to a gas and expands to cause voids or cells to form within the preform member and corresponding expansion of the preform member into a foam preform member having a greater volume than in its initial form. The SC foaming process also results in voids or cells formed throughout the foam preform member that are substantially uniform in size and shape and further are smaller than cells or voids that are present in conventional foam materials. The foam preform member further has a density that is lower than conventional foam materials. In an embodiment, the cell density is in a range from about $10^9$ to about $10^{15}$ per cubic centimeter of the material At 760, the foam preform member is removed from the vessel and placed within a cavity of a final, second mold. At 770, the second mold shapes and forms the foam preform member under elevated temperature and/or elevated pressure to form the resultant product or SC foam layer (e.g., layer 230/430 of sole structure 210/410).

Thus, a sole structure as described herein combines the features of plate and/or interface geometry between foam layers of the sole structure along with forming one or more layers of the sole structure with SC foam, which results in enhanced performance characteristics of the sole structure when combined with an upper to form an article of footwear or shoe. In particular, the combination of plate geometry or transition between the upper and lower sole structure layers (in which the geometry includes an elliptical curvature with nadir at a location along the sole structure as described herein) along with the SC foam structure having cell sizes/cell densities as noted herein (where the SC foam provides high resiliency/high energy return during compression/decompression of the layers) enhances roll acceleration and faster heel-to-toe striking movements as well as higher or greater push-off angles at the toe of the sole structure during use (e.g., in sprinting activities, running activities, etc.).

Figure 10A:
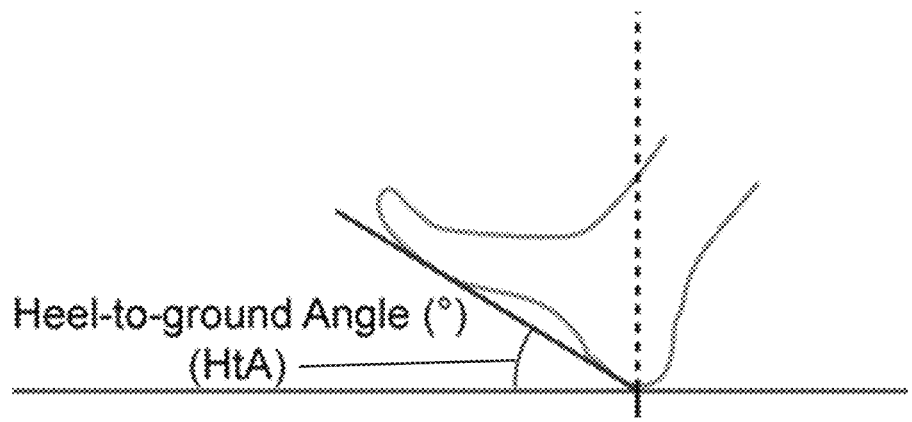
FIG. 10A is a schematic showing the heel strike and associated heel strike angle.

For example, the above-described system may improve running performance by improving the efficiency of the gait cycle or improving the propulsive power at toe-off. The gait cycle includes the stance phase and the swing phase. The stance phase, in which the foot receives the weight of the body and propels it forward, is generally divided into five stages. Specifically, the stages of gait during stance phase include the heel strike (FIG. 10A), flat foot, midstance, and the propulsive stages. At heel strike, the first contact of heel on the lead leg occurs (while the "toe-off" of the contralateral leg occurs). At the foot-flat phase, the body weight is transferred to the lead leg. This phase occurs after the heel strike of the lead leg and ends at the first contact of the first metatarsal head of the lead leg. The midstance phase is the point where the support limb moves from shock absorption to more of a stability function. The midstance stage begins at toe-off of the contralateral leg and ends when to the heel of the lead leg comes off the ground.

Figure 10B:
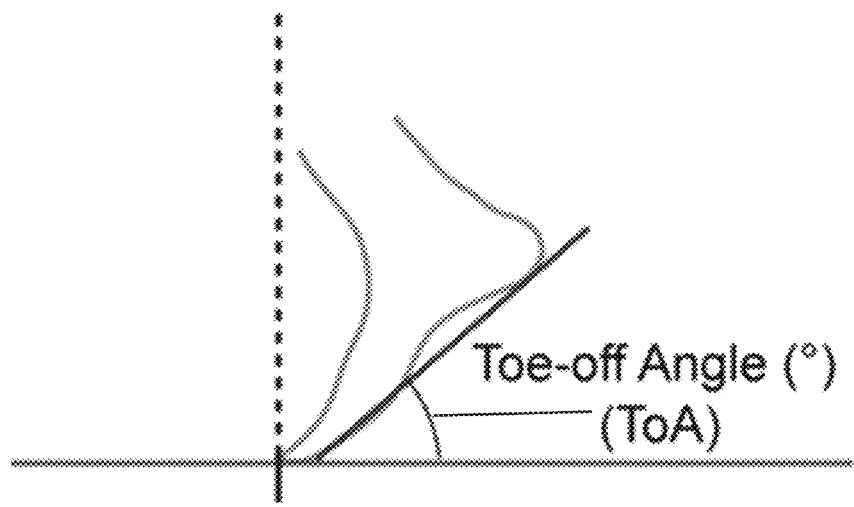
FIG. 10B is a schematic showing the push-of stage of the gait cycle and associated push-off angle.

The final stage of the stance phase is the propulsive stage. During the propulsive stage, the foot typically supinates to allow for a more rigid mid-foot, so it can act more like a lever to help propel the body forward. The total propulsive phase is the point the heel comes off for the lead leg to toe-off of the lead leg, creating or toe-off angle (ToA) as shown in FIG. 10B (also called an ankle push-off angle). Specifically, when the leg moves into the drive phase while running, the toes begin to dorsiflex. This action turns the foot arch into a rigid lever; moreover, the foot generates a large amount of potential energy as the plantar fascia is being stretched. As the foot pushes off the ground, the toes plantar-flex (toes push down) and release energy stored in the plantar fascia. Extension of the toes as the heel rises enables push-off against the ground to transition from one step to the next.

Stated differently, ankle push-off occurs when muscle-tendon units about the ankle joint generate a burst of positive power at the end of stance phase. Ankle push-off contributes to not only leg swing acceleration, but also center of mass acceleration. As a result, the amount of ankle push-off is critical to affect speed of movement.

While not being bound to a particular theory, it is believed that to maximize propulsion during running, it is necessary to properly position the ankle and the toes and/or metatarsals at push-off. Specifically, it is believed that maximizing the push-off angle of the foot may not only maximize the potential energy stored in the plantar fascia (due to the additional stretch created by a higher push off angle), but also maximizes toe expansion, thereby maximizing ground contact between the toes and/or metatarsals, permitting the application of greater push-off force during the gait cycle.

It has been determined that incorporating these combination of features (elliptical geometry at transition or boundary between SC foam layers, particularly when a sole plate is provided) increases the push-off angle of sole structure from a ground surface at the front or toe end of the shoe when compared with conventional shoes or even shoes implementing one or more SC foam layers but without the elliptical geometry feature.

In particular, tests were conducted in which shoes (Shoe A) having sole structures as described herein and depicted in FIGS. 2 and 3 (sole plate with elliptical plate geometry provided between two, upper and lower, SC foam layers) were compared with (1) shoes (Shoe B) including sole structures including two SC foam layers but with no sole plate and no elliptical geometry at the transition region between the foam layers and (2) shoes (Shoe C) including a plate positioned between foam layers but lacking elliptical plate geometry (e.g., a plate possessing a constant radius of curvature). Athletes all shoe types (Shoe A, Shoe B and Shoe C) engaged in running activities and the performance of the two types of shoes were compared.

As noted above, the push-off angle is the angle between the foot and the ground during push off at the instant of maximum ankle joint power. It is believed that the push-off angle represents the efficacy with which the ankle applies forward force to the ground, a key contributor in sustaining a given running speed. A higher angle suggests that the athlete is further up on their toes and therefore positioned to apply more forward force to the ground. That it, it encourages flexure along the MPT joint, permitting extension of the toes. Thus, it is believed the higher the push-off angle, the greater or the more efficient the propulsion during the gait cycle.

EXPERIMENTAL

The push-off angle values were determined for each of Shoe A, Shoe B and Shoe C. The angle values were derived through typical biomechanical analytical methods using optical motion capture in combination with force platforms (to determine maximum force applied). Inverse dynamics calculations are used to determine the timing of peak propulsion. The ankle joint center location and force center of pressure data, collected from motion capture and force platforms, respectively, are used in combination to measure the push-off Angle at the determined point in time.

The results of the above testing generated the results seen in Table I.

TABLE I

| Shoe | Push-off Angle |
| --- | --- |
| Shoe A | 59.3-59.7° |
| Shoe B | 57.9° |
| Shoe C | 57.3° |

As shown, the shoes as described herein (Shoe A) performed better in relation to the other shoes (Shoe B and Shoe C) with regard to push-off angle at the toe end of the shoe (e.g., at the start of a running activity and during heel-to-toe striking movements during the running activity). The average push-off angle of the shoes described herein (Shoe A) was greater than the average push-off angle of the other shoes (Shoe B and Shoe C) during the sprinting activity.

Accordingly, by utilizing the elliptical curvature configuration, the push-off angle of the shoe was increased relative to conventional plates (Shoe C) or shoes lacking the plate. In embodiments, the plate of the invention possesses push-off angle values at least about 58° (±0.05°), preferably at least about 59° (±0.05°), and more preferably at least about 60° (±0.05°).

Additionally, during the stance phase, the foot experiences several stages of rocker motion: (1) the heel rocker; (2) the ankle rocker and (3) the forefoot rocker. The heel rocker phase begins at heel strike, where the ankle is in a slight plantarflexed position pivoting around the calcaneus until the foot is flat on the ground. The ankle rocker stage is where the ankle moves from plantarflexion to dorsiflexion during which the tibia and fibula rotate forward around the ankle allowing forward progression of the body. Finally, during the forefoot rocker stage, the ankle starts to plantar-flex, lifting the ankle above the forefoot and continuing until maximum plantarflexion is achieved at toe-off. At the forefoot rocker stage, power generation is achieved.

At forefoot rocker, the leg begins the swing phase. The swing phase, when the foot is not in contact with the ground, is divided into early, intermediate, and late stages. It consists of an early acceleration phase and late deceleration phase.

It is believed the elliptical contouring of the plate increases the velocity of rotation through the rocker stages and, in particular, the forefoot rocker stage. While not being bound to a particular theory, it is believed the elliptical contour creates a rocker motion that helps roll the foot forward over the MTP joints without as much pressure from the calves. This may result in a faster transition from heel strike to toe-off thereby increasing running efficiency over repeating gait cycles.

While the invention has been described in detail and with reference to specific embodiments thereof, it will be apparent to one skilled in the art that various changes and modifications can be made therein without departing from the spirit and scope thereof.

Thus, it is intended that the present invention covers the modifications and variations of this invention provided they come within the scope of the appended claims and their equivalents.

It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. A sole structure comprising a plate, the plate comprising a curved portion having a geometry defined by a portion of an ellipse that is aligned in relation to the sole structure such that a major axis of the ellipse is tilted at an angle T from a support surface that supports the sole structure, wherein the angle T is from about 2 degrees to about 10 degrees, and the ellipse has an aspect ratio from about 1.1 to about 1.9;
wherein:
the plate includes a first end that corresponds with a heel end of the sole structure and a second end that corresponds with a toe end of the sole structure, and the curved portion extends at or beyond a midpoint of a lengthwise dimension of the plate and toward the second end of the plate;
a nadir of the plate is defined along the curved portion at a minor axis of the ellipse; and
the plate is situated within the sole structure such that the nadir of the plate is disposed between the first end and a metatarsal phalangeal joint (MPJ) location along the plate that corresponds with metatarsal bones of a foot of a user when the sole structure in incorporated as part of a shoe worn by the user, and the nadir is located a distance from the MPJ location that ranges from about 10 mm to about 40 mm.

2. The sole structure of claim 1, wherein the ellipse has an aspect ratio from about 1.3 to about 1.6.

3. The sole structure of claim 1, wherein the plate is formed of carbon.

4. The sole structure of claim 1, further comprising:
a first layer; and
a second layer;
wherein the plate is disposed between the first layer and the second layer.

5. The sole structure of claim 4, wherein the second layer is disposed below the first layer and has a hardness that is greater than a hardness of the first layer.

6. The sole structure of claim 4, wherein at least one of the first layer and the second layer comprises a supercritical (SC) foam material.

7. The sole structure of claim 6, wherein a cell size of the SC foam material is less than 100 micrometers.

8. The sole structure of claim 7, wherein the cell size of the SC foam material ranges from about 0.1 micrometer to about 10 micrometers.

* * * * *